(12) United States Patent
Jandwani

(10) Patent No.: US 9,819,802 B2
(45) Date of Patent: *Nov. 14, 2017

(54) SYSTEMS AND METHODS OF NATURAL LANGUAGE PROCESSING TO RANK USERS OF REAL TIME COMMUNICATIONS CONNECTIONS

(71) Applicant: Ingenio, LLC, San Francisco, CA (US)

(72) Inventor: Neeraj Jandwani, San Ramon, CA (US)

(73) Assignee: INGENIO, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,913

(22) Filed: Oct. 24, 2016

(65) Prior Publication Data

US 2017/0041467 A1    Feb. 9, 2017

Related U.S. Application Data

(63) Continuation of application No. 15/166,888, filed on May 27, 2016, now Pat. No. 9,509,846.

(Continued)

(51) Int. Cl.
*H04M 3/00* (2006.01)
*H04M 5/00* (2006.01)
(Continued)

(52) U.S. Cl.
CPC ............. *H04M 3/56* (2013.01); *G06F 17/28* (2013.01); *G06F 17/30867* (2013.01); *G06N 7/005* (2013.01); *G06N 99/005* (2013.01); *G09B 7/00* (2013.01); *G10L 15/26* (2013.01); *H04L 65/1069* (2013.01); *H04M 3/42221* (2013.01); *H04M 3/5232* (2013.01); *H04M 3/5233* (2013.01); *G06F 7/026* (2013.01); *G06Q 20/14* (2013.01); *G06Q 30/0275* (2013.01); *H04M 7/003* (2013.01); *H04M 2201/40* (2013.01);

(Continued)

(58) Field of Classification Search
CPC .... H04M 3/5183; H04M 3/5191; H04M 3/51; H04M 3/5232; H04M 3/5233; H04M 3/523
USPC ............ 379/265.11, 265.09, 265.12, 265.05, 379/266.1, 212.01, 211.02, 85; 370/352
See application file for complete search history.

(56) References Cited

U.S. PATENT DOCUMENTS 6,223,165 B1 * 4/2001 Lauffer .............. G06Q 10/0631
                                                            705/26.41
7,606,714 B2 * 10/2009 Williams .............. G10L 13/027
                                                            379/265.02

(Continued)

*Primary Examiner* — Thjuan K Addy
(74) *Attorney, Agent, or Firm* — Grenberg Traurig, LLP

(57) ABSTRACT

A computing apparatus configured to perform natural language processing, e.g., by comparing the words in a communication transcript of a user to a list of keywords, to generate an input vector representing a pattern of text in the communication transcript. A predictive model is generated from correlating input vectors to user ranking scores, e.g., for retention. The input vector determined from a communication transcript is applied to the computation model to compute a predicted retention score of the user. The retention score can be used, for example, to select a personalized recommendation for a communication connection to an adviser and/or a targeted offer.

20 Claims, 13 Drawing Sheets

Related U.S. Application Data

(60) Provisional application No. 62/167,041, filed on May 27, 2015.

(51) Int. Cl.

| | | |
|---|---|---|
| *H04M 3/523* | (2006.01) | |
| *G06F 17/27* | (2006.01) | |
| *H04L 29/06* | (2006.01) | |
| *G06F 17/30* | (2006.01) | |
| *G06N 7/00* | (2006.01) | |
| *G06N 99/00* | (2010.01) | |
| *H04M 3/56* | (2006.01) | |
| *G06F 17/28* | (2006.01) | |
| *G09B 7/00* | (2006.01) | |
| *G10L 15/26* | (2006.01) | |
| *H04M 3/42* | (2006.01) | |
| *G06F 7/02* | (2006.01) | |
| *G06Q 20/14* | (2012.01) | |
| *G06Q 30/02* | (2012.01) | |
| *H04M 7/00* | (2006.01) | |

(52) U.S. Cl.
CPC .............. *H04M 2203/2061* (2013.01); *H04M 2203/408* (2013.01); *H04M 2203/551* (2013.01); *H04M 2203/558* (2013.01)

(56) References Cited

U.S. PATENT DOCUMENTS

| | | |
|---|---|---|
| 7,962,644 B1 | 6/2011 | Ezerzer et al. |
| 8,594,302 B2 | 11/2013 | Youd et al. |
| 8,644,490 B2 | 2/2014 | Stewart |
| 8,718,271 B2 | 5/2014 | Spottiswoode |
| 8,750,488 B2 | 6/2014 | Spottiswoode et al. |
| 8,781,106 B2 | 7/2014 | Afzal |
| 8,824,658 B2 | 9/2014 | Chishti |
| 8,903,079 B2 | 12/2014 | Xie et al. |
| 8,913,736 B2 | 12/2014 | Kohler et al. |
| 9,002,920 B2 | 4/2015 | Deryugin et al. |
| 9,025,757 B2 | 5/2015 | Spottiswoode et al. |
| 9,350,808 B2 | 5/2016 | Beck et al. |
| 9,426,296 B2 | 8/2016 | Chishti et al. |
| RE46,153 E | 9/2016 | Makagon et al. |
| 9,462,127 B2 | 10/2016 | Kan et al. |
| 9,509,846 B1 | 11/2016 | Jandwani |
| 9,516,171 B2 | 12/2016 | Neyman et al. |
| 9,686,411 B2 | 6/2017 | Spottiswoode et al. |
| 2002/0026390 A1 | 2/2002 | Ulenas et al. |
| 2002/0045154 A1 | 4/2002 | Wood et al. |
| 2003/0064788 A1 | 4/2003 | Walker et al. |
| 2004/0093261 A1 | 5/2004 | Jain et al. |
| 2005/0055275 A1 | 3/2005 | Newman et al. |
| 2005/0081139 A1 | 4/2005 | Witwer et al. |
| 2006/0143081 A1 | 6/2006 | Argaiz |
| 2007/0078719 A1 | 4/2007 | Schmitt et al. |
| 2007/0282791 A1 | 12/2007 | Amzalag et al. |
| 2009/0198566 A1 | 8/2009 | Greenberg |
| 2009/0327036 A1 | 12/2009 | Ports, III et al. |
| 2010/0161407 A1 | 6/2010 | Farmer et al. |
| 2010/0306032 A1 | 12/2010 | Jolley |
| 2010/0324971 A1 | 12/2010 | Morsberger |
| 2011/0087550 A1 | 4/2011 | Fordyce, III et al. |
| 2011/0225157 A1 | 9/2011 | Rajaram et al. |
| 2012/0047021 A1 | 2/2012 | Borchetta et al. |
| 2012/0059707 A1 | 3/2012 | Goenka et al. |
| 2012/0116878 A1 | 5/2012 | Falk et al. |
| 2012/0130817 A1 | 5/2012 | Bousaleh et al. |
| 2012/0271697 A1 | 10/2012 | Gilman et al. |
| 2012/0303552 A1 | 11/2012 | Zayas et al. |
| 2013/0046717 A1 | 2/2013 | Grigg et al. |
| 2013/0067456 A1 | 3/2013 | Khilnani et al. |
| 2013/0166360 A1 | 6/2013 | Kshetramade et al. |
| 2013/0191223 A1 | 7/2013 | Harris et al. |
| 2016/0352901 A1 | 12/2016 | Jandwani |
| 2016/0352906 A1 | 12/2016 | Jandwani |

* cited by examiner

SYSTEMS AND METHODS OF NATURAL LANGUAGE PROCESSING TO RANK USERS OF REAL TIME COMMUNICATIONS CONNECTIONS

RELATED APPLICATIONS

The present application is a continuation application of U.S. patent application Ser. No. 15/166,888, filed May 27, 2016 and entitled "SYSTEMS AND METHODS OF NATURAL LANGUAGE PROCESSING TO RANK USERS OF REAL TIME COMMUNICATIONS CONNECTIONS", which claims the benefit of the filing date of Prov. U.S. Pat. App. Ser. No. 62/167,041, filed May 27, 2015 and entitled "SYSTEMS AND METHODS TO RANK USERS OF REAL TIME COMMUNICATIONS CONNECTIONS", the entire disclosures of which application are hereby incorporated herein by reference.

FIELD OF THE TECHNOLOGY

At least some embodiments of the present disclosure relate to natural language processing and real-time communication systems in general and, more specifically but not limited to, natural language processing for ranking users of real-time communications connections.

BACKGROUND

U.S. Pat. No. 6,223,165, entitled "Method and apparatus to connect consumer to expert", discloses a server which can store and display information about experts and assist in connecting the expert and consumer for real-time communication. In response to a keyword search or a category selection, the server presents a list of experts, including information such as availability, avatar, certification, compensation rate, quality score, etc. of the experts. After a consumer selects an expert from the list, a central controller places a telephone call to the consumer and a separate telephone call to the expert to establish a telephonic connection between the consumer and the expert. The central controller may monitor the duration of the telephonic connection to charge the consumer in accordance with the compensation rate of the expert and the length of the duration, and compensate the expert accordingly.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In a communication system in which advisers are presented to customers concurrently for selectively establishing real time communication connections based on user inputs, there are frequent collisions in different users being in processes leading to real time communication connections to a same adviser.

At least some embodiments of the present disclosure provide techniques to avoid, reduced, and/or resolve collisions of processes leading to real time communication connections to the same adviser.

Figure 1:
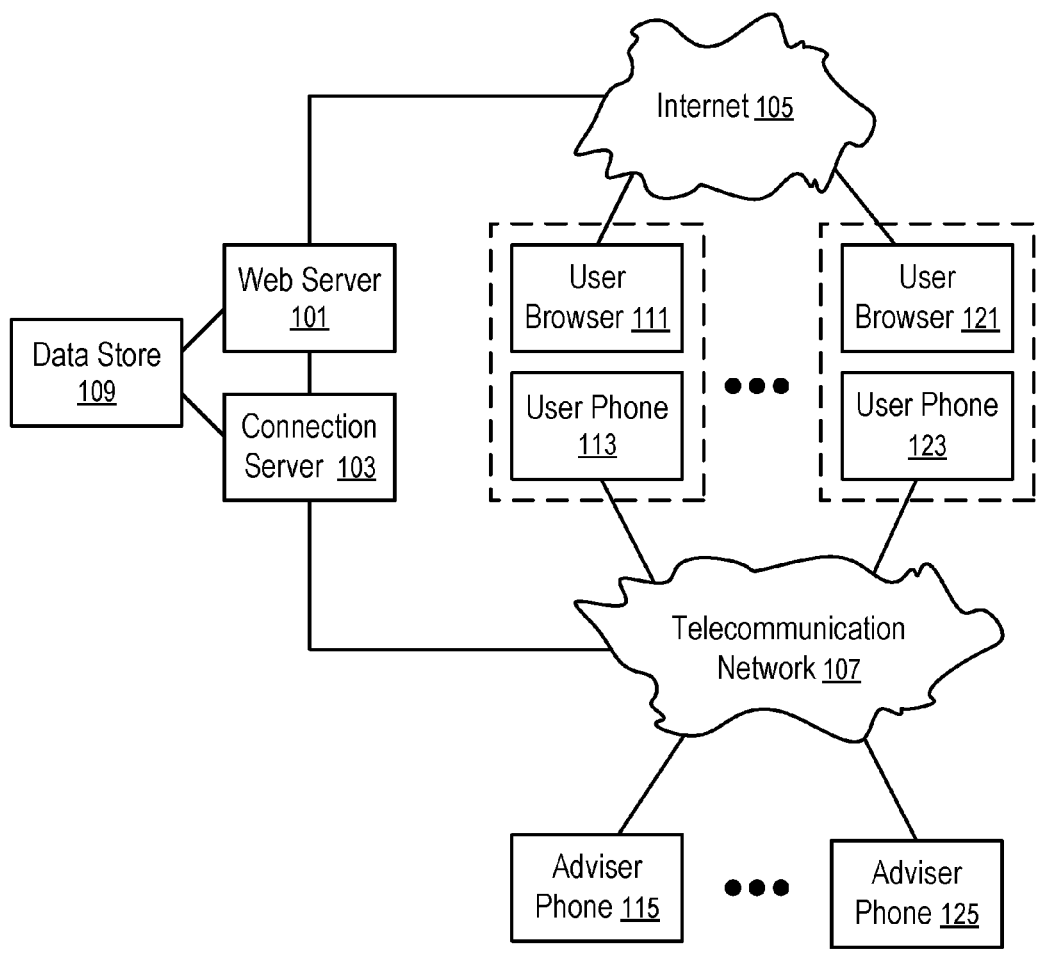
FIG. 1 shows a system in which techniques of various embodiments are implemented.

FIG. 1 shows a system in which techniques of various embodiments are implemented to avoid collisions in establishing real-time communication connections.

In FIG. 1, a data store (109) is configured to store the listings of advisers. A web server (101) is configured to present the listings of the advisers to the user browsers (111, . . . , 121) via the internet (105).

For example, the user browsers (111, . . . , 121) may be used to search for advisers offering services based on keywords, categories, topics, customer ratings, description, certification, expertise, prices, etc.

In view of the presentation of the advisers in the user browsers (111, . . . , 121), the users of the respective user browsers (111, . . . , 121) may selectively identify advisers and request the connection server (103) to establish connections between the users and the selected advisers.

For example, a user may use a user browser (111) to select an adviser based on a listing presented in the user browser (111), and identify the user phone (113) (e.g., by providing the phone number of the user phone (113)). An adviser phone (115) of the selected adviser is identified, for example, based on a phone number associated with the listing of the adviser in the data store (109). The connection server (103) is configured to call the user phone (113) and the adviser phone (115) separately and then bridge the calls to establish a telephonic connection between the user phone (113) and the adviser phone (115) via the telecommunication network (107).

The adviser phones (115, ..., 125) and the user phones (113, ..., 123) may be connected to traditional land-line of telephone networks, wireless telecommunication networks for mobile phones (e.g., cellular phones, smart phones), or data communication networks connected to computing devices running soft phones (e.g., via Voice over Internet Protocol or other communication protocols).

The user browsers (111, ..., 121) may run in the same computing devices on which the respective user phones (113, ..., 123) of the users are implemented, or in computing devices separate from the user phones (113, ..., 123).

FIG. 1 illustrates a system to establish telephonic connections for real time communications. Alternatively or in combination, the user phones (113, ..., 123) and the adviser phones (115, ..., 125) can be replaced with computing devices, such as computers, smart phones, tablet computers, digital media players, personal digital assistants, etc., for other forms of real time communications, such as instant messaging, text chat, video chat, etc.

Collision Avoidance

In one embodiment, there is a time gap between a user selecting an adviser via the user browser (111) and the connection server (103) attempting to establish a connection to the adviser phone (115) of the selected adviser.

Between the time gap the web server (101) is configured to identify the user, register the user as a member if the user is not already registered, verifying a source of payment of the user for the services to be provided by the selected adviser, obtain the phone number of the user phone (113), etc.

Between the time gap the connection server (103) is configured to establish a telephonic connection with the user phone (113) via the telecommunication network (107).

In some embodiments, the connection server (103) initiates the call to the user phone (113) identified by the user via the user browser (111), or stored in the data store (109) in association with an account of the user.

In some embodiments, the web server (101) may present a phone number of the connection server (103) to request the user to call the connection server (103) to establish the telephonic connection between the user phone (113).

After the telephonic connection between the user phone (113) is established, the connection server (103) is configured to verify the identity of the user (101), identify a source of payment for the services of the system and the adviser, and/or obtain an approval from the user to bill the source of payment in accordance with a compensation rate of the adviser, etc.

In general, after the user selects the adviser using the user browser (111), the system may fail to reach the execution point to establish a connection to the adviser phone (115) for various reasons, such as the user refuses to register, the user refuses to identify a source of payment, the user fails to pick up the call placed by the connection server (103) to the user phone (113), the user fails to call the connection server (103) from the user phone (113), the user fails to provide information for identity verification in the telephonic connection between the connection server (103) and the user phone (113), the user fails to approve the compensation rate of the adviser over the telephonic connection between the connection server (103) and the user phone (113), etc.

In general, there is a significant time gap between the user selecting the adviser and the connecting server (103) attempting a connection to the adviser phone (115); and there is a significant uncertainty as whether the connection process staring from the user selecting the adviser using the user browser (111) will successfully reach the point where the connection server (103) establishes the connection to the adviser phone (115).

After the connection between the connection server (103) and the adviser phone (115) is established, the corresponding adviser can be considered being unavailable for real time communications with other users. However, it is generally not desirable to consider the adviser selected by the user for connection as being unavailable, due to the significant time gap and the uncertainty discussed above.

In one embodiment, if the adviser indicates to the web server (101) that the adviser is available for real time communications with customers, and the connection server (103) has not yet established a connection with the adviser phone (115), the adviser is considered to be available for real time communications with other users, even after the user selecting the adviser using the user browser (111). Thus, the adviser can be presented to other users during the time gap between the user selecting the adviser and the connecting server (103) attempting a connection to the adviser phone (115). Such presentations increase the success rate of the adviser reaching a customer and reduce the time period the adviser has to wait to reach a customer, due to the uncertainty in the user (and other users) finally being connected to the adviser, and the significant time gap between a user selecting the adviser and the user can be actually connected to the adviser.

However, presenting the adviser concurrently to multiple users significantly increases the possibility that more than one user will select the adviser, leading to a collision where a first user phone (e.g., 113) is currently being connected to the adviser phone (115), while a second user phone (e.g., 123) is ready to be connected to the same adviser phone (115).

In one embodiment, to reduce the chance of collision, the system is configured to reduce the time gap between the user selecting the adviser and the connection server (103) connecting the user phone (113) to the adviser phone (115).

For example, the web server (101) and the connection server (103) are configured to reduce the operations to be performed between the user selecting the adviser and the connection server (103) connecting the user phone (113) to the adviser phone (115).

For example, the system may be configured to require the user (101) to register prior to selecting a particular adviser, or require the user (101) to confirm a selection of the adviser after the registration.

In one embodiment, the system is configured to customize the order of presentations of listings to reduce the chance of collisions, as further discussed below.

Figure 2:
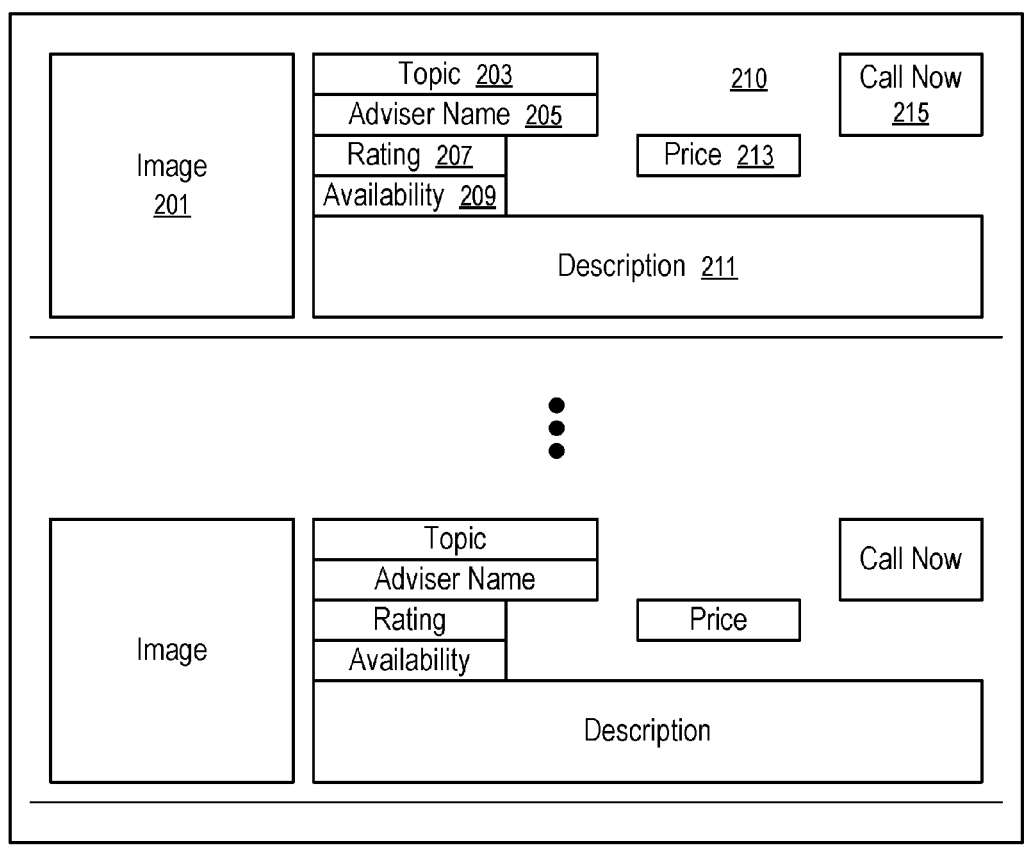
FIG. 2 illustrates a user interface to present advisers according to one embodiment.

FIG. 2 illustrates a user interface to present advisers according to one embodiment.

In FIG. 2, the user interface presents the listings of a plurality of advisers as a list. Each listing of an adviser may include content such as an image (201) representing the adviser, a topic (203) of advice offered by the adviser, a name (205) of the adviser, a rating (207) of the adviser by former customers of the adviser, the availability (209) of the adviser at the time the listing is presented in the user interface, the compensation price (213) of the adviser, a description (211) provided by the adviser about the services offered by the adviser, a "call now" button (215) that can be activated to select the advertiser for a connection to the adviser.

In one embodiment, the listings of different advisers are ranked and presented in accordance with the rankings of the advisers.

For example, the advisers may be ranked based on price (213), customer rating (207), availability (209), degree of matching with the search criteria specified by the user, and/or advertising bids of the advisers.

When user browsers (111, . . . , 121) submit similar search requests, the ranked and sorted list of the listings of advisers may appear in similar orders. Since the users are likely to select the top advisers in the list, the chance of collision increases when the lists presented to different users showing the same adviser at the top of the lists that are presented substantially concurrently.

Figure 3:
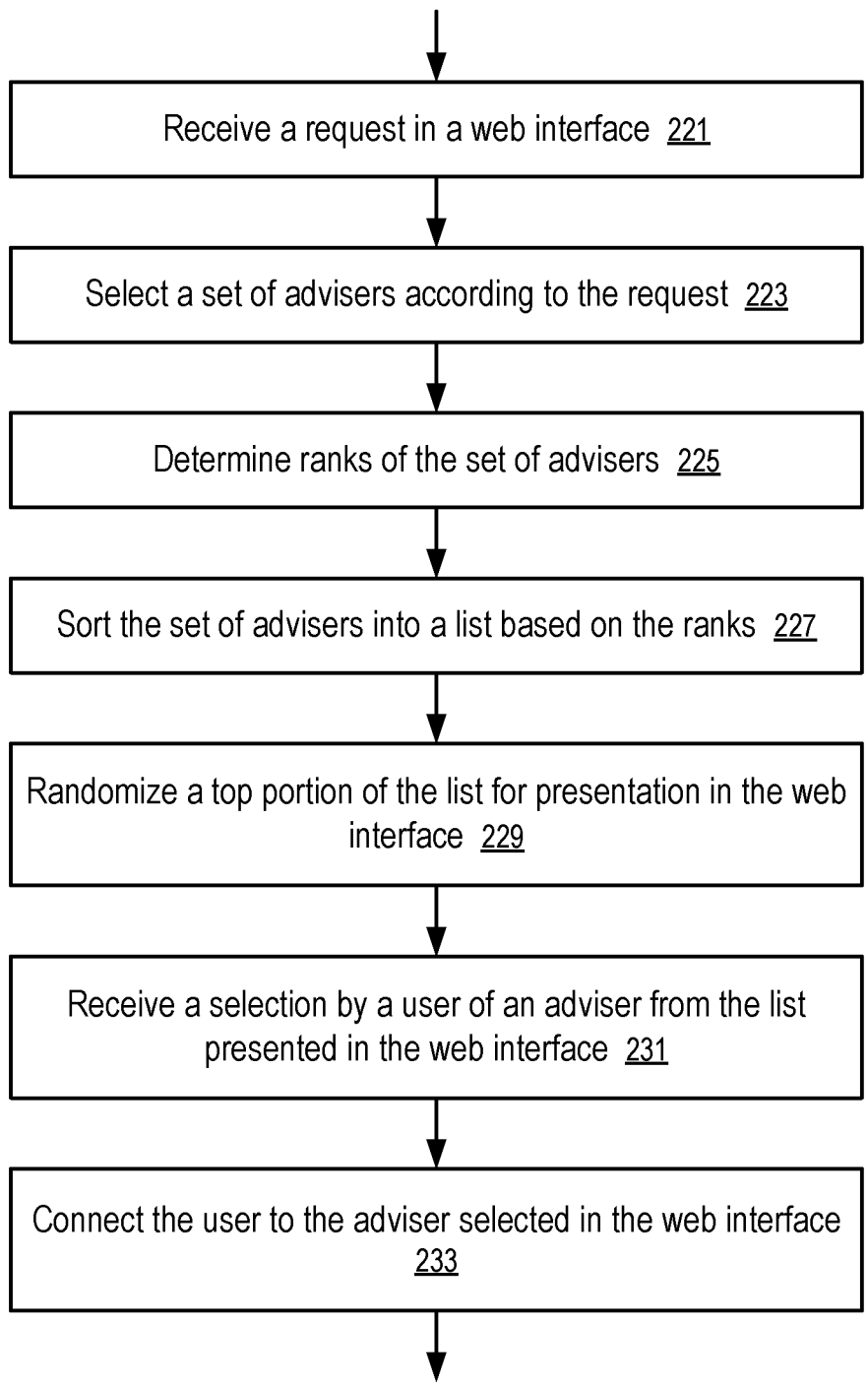
FIG. 3 shows a method to reduce collisions in establishing real-time communication connections according to one embodiment.

In one embodiment, to reduce the chance of collision, the top portions of the lists presented to the users are randomized, in a way illustrated in FIG. 3.

FIG. 3 shows a method to reduce collisions in establishing real-time communication connections according to one embodiment. In one embodiment, the method of FIG. 3 is implemented in a communication system illustrated in FIG. 1.

In one embodiment, the web server (101) is configured to receive (221) a request via a web interface presented using a user browser (111). In response, the web server (101) (or another server connected with the web server (101)) is configured to select (223) a set of advisers according to the request, based on the data in the data store (109). The server then determines (225) ranks of the set of advisers, sorts (227) the set of advisers into a list based on the ranks, and randomizes (229) a top portion of the list for presentation in the web interface.

After the web server (101) receives (231) a selection by a user of an adviser from the list presented in the web interface, the connection server (103) connects (233) the user to the adviser that was selected in the web interface by the user.

Since the order of the listings presented in the top portion of the list is randomized, the chance of different users selecting the same top adviser presented on their respective lists is reduced. Thus, the possibility of collision in requests for real time communications to the same top adviser is reduced.

In one embodiment, the web server (101) is configured to select the top portion of the list based on a predetermined count of listings (e.g., to randomize the order of the top 10 listings).

In one embodiment, the web server (101) is configured to score the listings in determining (225) the ranks of the set of advisers. For example, the ranking score of a listing of an adviser can be a function of the compensation price (213) of the adviser, the customer rating (207) of the adviser, the current availability status (209) of the adviser for real time communications, the degree of matching between the search terms provided by the user and the descriptions (211) of the listing, etc. The web server (101) is configured to randomize the order of the listings that have the score above a predetermined threshold.

In one embodiment, the web server (101) is configured to randomize the predetermined count of listings (e.g., randomize the order of the top 10 listings), when the number of listings having ranking scores above the threshold are more than the predetermined count.

In one embodiment, the web server (101) is configured to analyze the clustering of the listings based on the relative closeness of the scores of the listings with each other and randomize listings in the cluster having the highest ranking scores.

Figure 4:
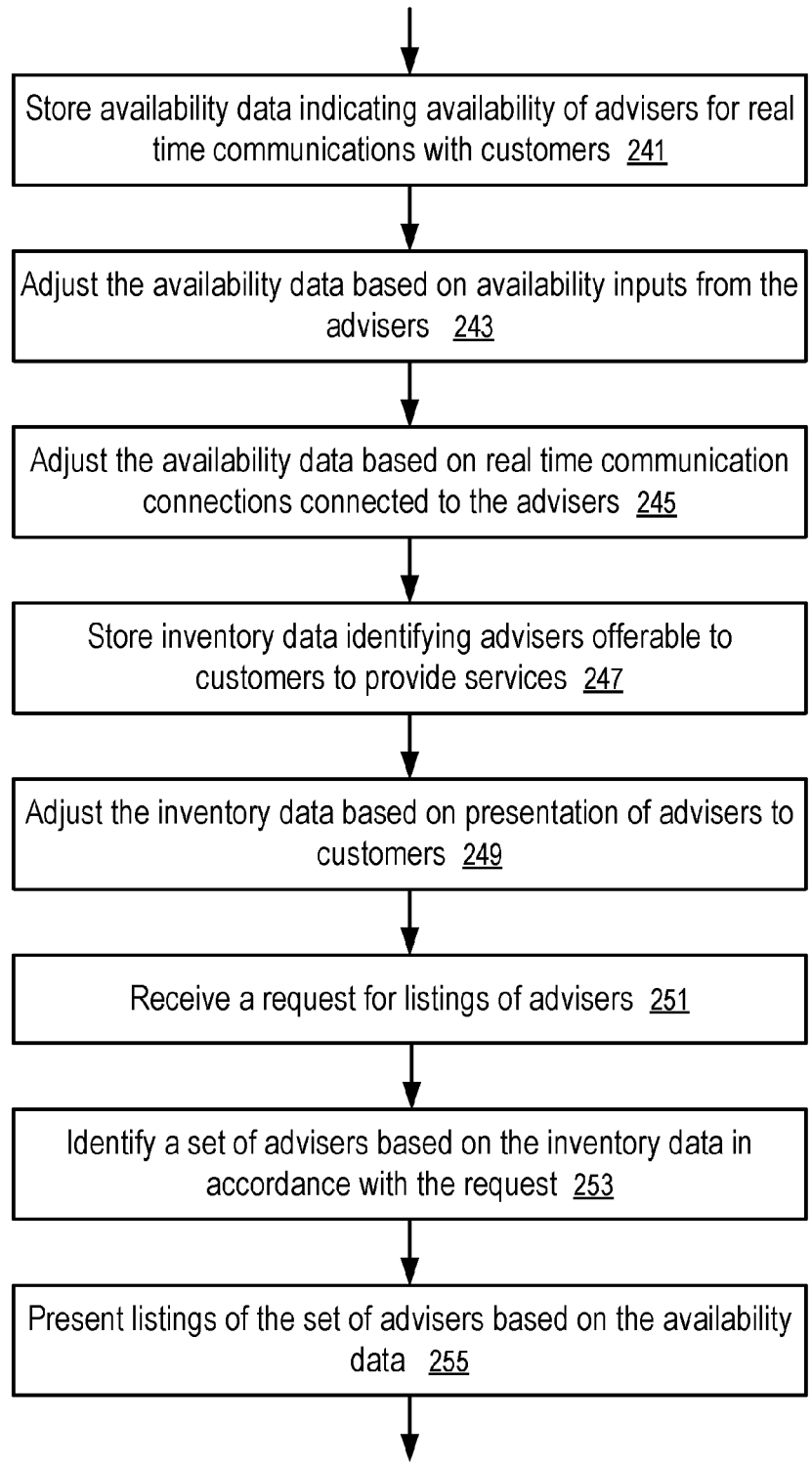
FIG. 4 shows another method to reduce collisions in establishing real-time communication connections according to one embodiment.

In one embodiment, the data store (109) is configured to store not only availability data indicating the current availability status of the advisers to accept real time communication connections, but also inventory data indicating whether the advisers are in the inventory for presentation to potential customers, in a way illustrated in FIG. 4.

FIG. 4 shows another method to reduce collisions in establishing real-time communication connections according to one embodiment. In one embodiment, the method of FIG. 4 is implemented in a communication system illustrated in FIG. 1.

In one embodiment, the data store (109) stores (241) availability data indicating availability of advisers for real time communications with customers. The web server (101) is configured to adjust (243) the availability data based on availability inputs from the advisers.

For example, when an adviser is ready for real time communications with customers, the adviser may sign into the system via the web server (101) to indicate that the adviser is available to accept a real time communication connection with the connection server (13) for delivering services over the real time communication connection to a user phone (e.g., 113, . . . , or 123).

For example, when the adviser wants to block requests for real time communication connection from the connection server (103), the adviser may sign into the system via the web server (101) to provide an indication that the adviser is unavailable (or sign off from the system).

In one embodiment, the connection server (103) is configured to adjust (245) the availability data based on real time communication connections connected to the advisers.

For example, when a connection is established between the connection server (103) and the adviser phone (115), the connection server (103) is configured in one embodiment to update the availability data to indicate that the adviser corresponding to the adviser phone (115) is not available.

For example, in response to disconnecting a telephonic connection between the connection server (103) and the adviser phone (115), the connection server (103) is configured in one embodiment to update the availability data to indicate that the adviser corresponding to the adviser phone (115) is available.

In addition to the availability data indicating the current availability of the advisers to accept real time communications connections, the data store (109) is configured to further store (247) inventory data identifying advisers offerable to customers to provide services.

In one embodiment, the web server (101) is configured to adjust (249) the inventory data based on presentation of advisers to customers.

For example, when the listing of an adviser was presented to a first user within a first predetermined period of time (or when it is determined that the first user is very likely to be connected to the adviser), the web server (101) may mark the listing of the adviser to indicate that the adviser is not in the inventory of advisers that can be presented to other users.

For example, when the listing of the adviser was presented to the first user more than a second predetermined period of time ago (or when it is determined that the first user is less likely to be connected to the adviser), the listing of the adviser can be marked to indicate that the adviser is back in the inventory of advisers that can be presented to other users.

For example, when the listing of the adviser has been selected for a connection by the user who has a high rate of successful connections in the past, the listing of the adviser can be marked to indicate that the adviser is not in the inventory of advisers that can be presented to other users.

In FIG. 4, after the web server (101) receive (251) a request for listings of advisers, the web server (101) (or another server connected to the web server (101)) identifies (253) a set of advisers based on the inventory data in accordance with the request and presents (255) listings of the set of advisers based on the availability data.

For example, if the inventory data indicates that an adviser is not in the inventory for presentation to customers, the listing of the adviser is not selected for presentation to a new customer, even when the adviser is currently available. By removing an adviser out of the inventory for a short period of time after the adviser is being presented in a top portion of a list of advisers, the change of different users selecting the same adviser is reduced.

In one embodiment, the data store (109) is configured to store data indicating the probability of an adviser being connected for delivering services to a user of the system within a predetermined period of time. The web server (101) is configured to rank the advisers based on the probabilities of advisers being connected within the predetermined period of time. An adviser having a high probability of being connected with the predetermined period of time is ranked to have a lower ranking score than a similar adviser having a low probability of being connected with the predetermined period of time. Thus, the system dynamically ranks the advisers to reduce probabilities of collisions in real time communication requests, in a way illustrated in FIG. 5.

Figure 5:
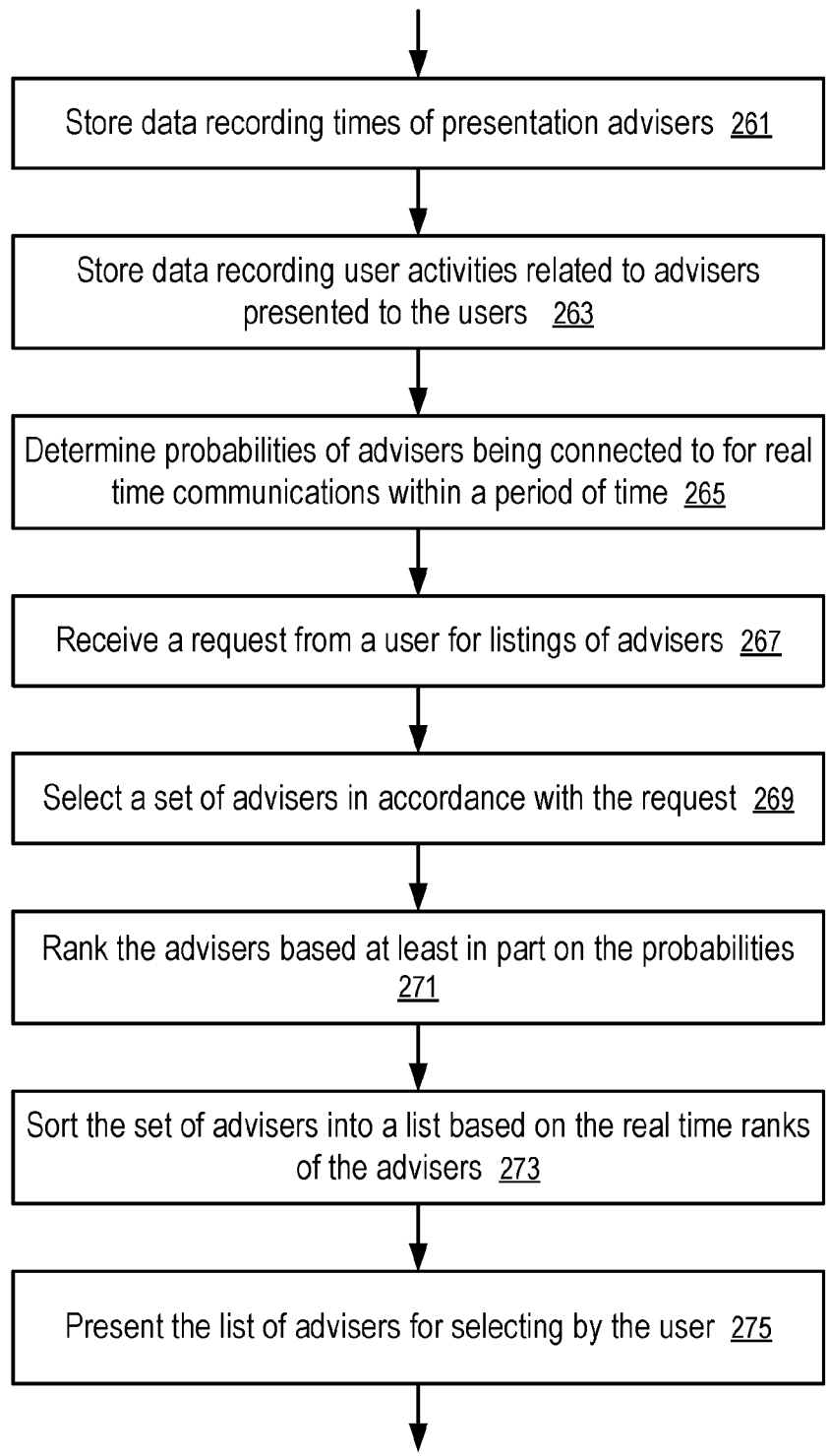
FIG. 5 shows a further method to reduce collisions in establishing real-time communication connections according to one embodiment.

FIG. 5 shows a further method to reduce collisions in establishing real-time communication connections according to one embodiment. In one embodiment, the method of FIG. 5 is implemented in a communication system illustrated in FIG. 1.

In one embodiment, the data sore (109) is configured to store (261) data recording times of presentation advisers and store (263) data recording user activities related to advisers presented to the users.

For example, after the presentation of a list of advisers to a user, the advisers on the lists having different estimated probabilities of being selected based on the positions of the advisers on the list.

For example, after an adviser is selected from the list, the probability of the adviser being connected to the user may be based on the current membership status of the user.

For example, after the user is identified, the probability of the user will be connected to the selected adviser can be estimated based on the prior connection patterns of the user.

In FIG. 5, the web server (101) (or another server connected to the web server (101)) is configured to determine (265) probabilities of advisers being connected to for real time communications within a period of time based on the data recording the presentation times of the advisers (261) and the user activities related to the presented advisers. For example, when more than one user has selected an adviser for a connection, the probability of the adviser being connected to for real time communications increases.

In response to receiving (267) a request from a user for listings of advisers, the web server (101) (or another server connected to the web server (101)) is configured to select (269) a set of advisers in accordance with the request, rank (271) the advisers based at least in part on the probabilities, and sort (273) the set of advisers into a list based on the real time ranks of the advisers. The web server (101) then presents (275) the list of advisers for selecting by the user in the user browser (111).

In one embodiment, the probabilities are adjusted in real time in accordance with the user activities related to the presented advisers, the presentations of the advisers, and the lapsed time since the presentation. In one embodiment, the probabilities are used to weight against the availability of the corresponding advisers in ranking the advisers.

In some embodiments, the methods of FIGS. 3, 4 and 5 are combined.

For example, in one embodiment, the inventor data is used as in FIG. 4 for the selection of the advisers; and the presentation order of the top portion of the list of selected and ranked advisers is randomized as in FIG. 3 to reduce collision.

For example, in one embodiment, the probability of advisers being connected to within a period of time is used as in FIG. 5 for the ranking of the advisers; and the presentation order of the top portion of the list of selected and ranked advisers is randomized as in FIG. 3 to reduce collision.

For example, in one embodiment, the inventor data is used as in FIG. 4 for the selection of the advisers; the probability of advisers being connected to within a period of time is used as in FIG. 5 for the ranking of the advisers; and the presentation order of the top portion of the list of selected and ranked advisers is randomized as in FIG. 3 to reduce collision.

In one embodiment, the system is configured to predict the collision of the progress of multiple users on track to be connected to the same adviser and organize a bidding session for the users to resolve the conflict. Thus, the users are informed of the possibility of losing the currently opportunity for being connected to the adviser; and when the user loses the opportunity to be connected the selected adviser after completing the intervening actions between the selection of the adviser and being connected to the adviser by the connection server (103), the user can be offered to be connected to an alternative adviser, or schedule an appointment.

Figure 6:
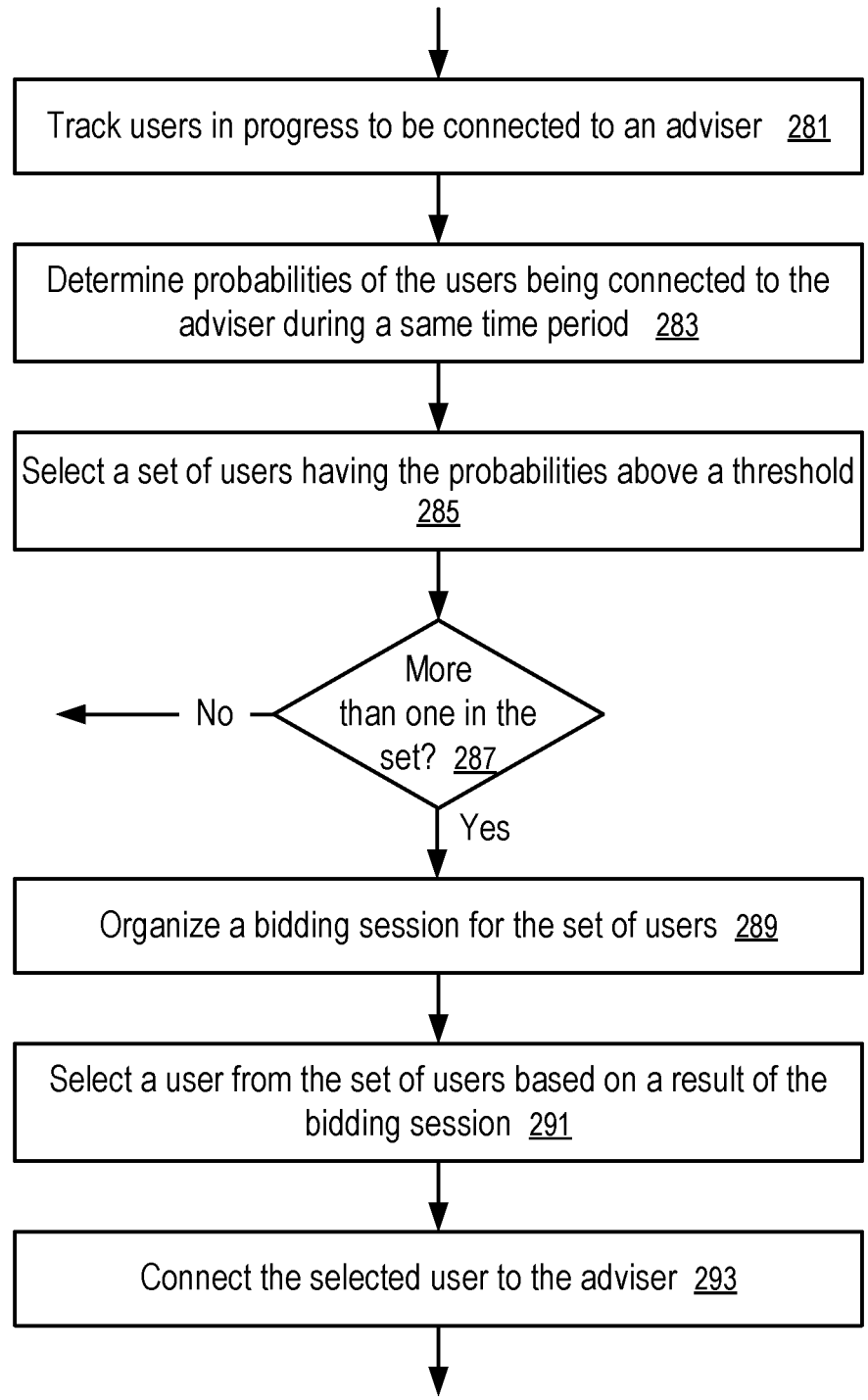
FIG. 6 shows a method to select a user for establishing a real time communication connection to an adviser according to one embodiment.

FIG. 6 shows a method to select a user for establishing a real time communication connection to an adviser according to one embodiment. In one embodiment, the method of FIG. 6 is implemented in a communication system illustrated in FIG. 1.

In FIG. 6, the data store (109) is configured to store data tracking (281) users in progress to be connected to an adviser. The web server (101) (or another server connected to the web server (101)) is configured to determine (283) the probabilities of the users being connected to the adviser during a same time period based on the stored data tracking (281) the progresses of the users.

In one embodiment, a set of users having the probabilities above a threshold is selected (285). If it is determined (287) that more than one user is selected in the set of users, the web server (101) is configured to organize (289) a bidding session for the set of users.

For example, using the user browsers (111, . . . , 121), the web server (101) is configured to inform the respective users that there are multiple users on the system in progress to be connected to the same adviser. The users may optionally offer bids for improved priority for being connected the same adviser. In some embodiments, the user interface presented in the user browser (111, . . . , 121) also allows a user to select an alternative adviser, if the user loses the bid.

In one embodiment, the bidding session adds a predetermined processing time between the selection of an adviser by a user and the connection of the user to the selected adviser. Thus, multiple users may concurrently enter the stage of being ready to be connected to the selected adviser. In one embodiment, the bidding session ends after the connection server (103) establish the connection to the adviser phone (115); and a user is selected (291) from the set of users based on a result of the bidding session and connected (293) to the adviser.

In some embodiments, the priorities of the users in the bidding session are based at least in part on the progress speeds of the users towards meeting all requirements (e.g., registration, identifying funding source) to establish connection between the user phones (113, . . . , 123) with the connection server (103)). A bid offered by a user may increase the priority of the user.

In one embodiment, the priorities of the users in the bidding session are replaced with a racing presentation in which the progress of a user relative to others is presented to indicate the competition among the users, without providing a facility to allow a user to improve his/her priority via increasing a priority bid. Thus, the users may see the real time progress of the respective users competing for the same adviser.

Satisfaction Guarantee

In one embodiment, the communication system as illustrated in FIG. 1 is configured to charge users on behalf of advisers for the services provided by the respective advisers over the communication connections established, via the web server (101) and the connection server (103), between the user phones (113, . . . , 123) and the adviser phones (115, . . . , 125).

For example, an adviser may specify a price (213) for the services delivered via the communication system; and a user, connected to the adviser via the communication system to receive the services, is charged by the communication system on behalf of the adviser in accordance with the price (213) specified by the adviser.

In one example, the price (213) is a predetermined amount of a predetermined currency for each unit of time (e.g., per minute) of the communication connection established by the connection server (103). In another example, the price (213) is a predetermined amount of funds for services delivered in a communication session that has a predetermined time limit (e.g., 30 minutes, an hour); the user may voluntarily terminate the communication session before the predetermined time limit; and the adviser may optionally extend the communication session for a period of time for free in some instances.

In one embodiment, the communication system is configured to monitor user interactions with the system to detect an indication of user dissatisfaction with the services provided by the adviser. The indication may be detected in view of a shortened communication session, a low rating provided by the user for the services received in the communication session, a negative feedback provided by the user for the services received in the communication session, etc. In response to detecting the indication of the user dissatisfaction, the system determines the likelihood of authenticity of the dissatisfaction, based on the history of the user using the system and/or the patterns of different users interacting with the adviser. If the dissatisfaction is determined to be authentic (e.g., not for the purpose to game the system to avoid payments), the system automatically provides a refund to the user, without the user explicitly requesting the refund and/or without requesting the user to explicitly confirm the automatically detected dissatisfaction. Thus, the user experience with the system can be improved, when the services provided by the adviser are not satisfactory to the user; and the efficiency of the processing of potential disputes over service quality is also improved.

Figure 7:
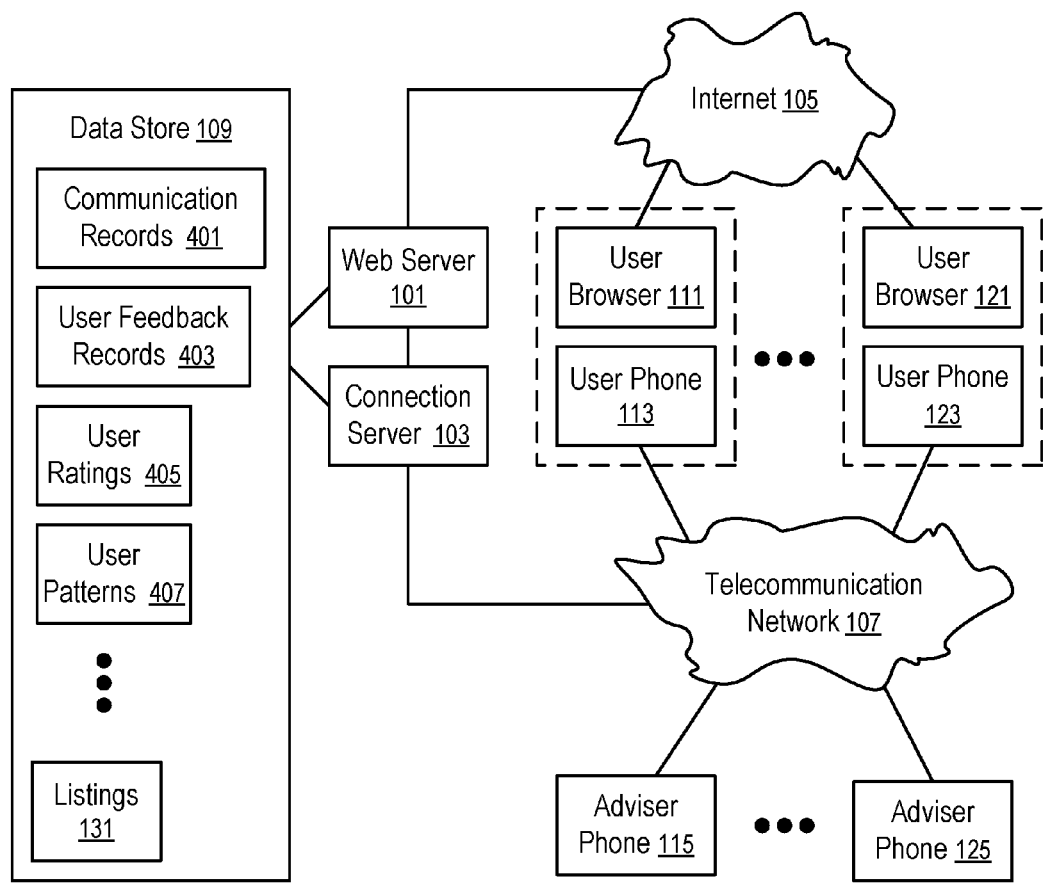
FIG. 7 shows a system to monitor the quality of services provided in real time communication connections according to one embodiment.

FIG. 7 shows a system to monitor the quality of services provided in real time communication connections according to one embodiment.

In FIG. 7, a data store (109) is configured to store the listings (131) of advisers for presentation to the user browsers (111, . . . , 121) via the web server (101).

For example, a user browser (111) may visit the web server (101) to search for a list of advisers, or browse the listings of advisers in a user selected service category. In response, the web server (101) identifies the requested listings and presents the listings to the user browser (111) via the internet (105).

For example, the user browsers (111, . . . , 121) may be used to search for advisers offering services based on keywords, categories, topics, customer ratings, description, certification, expertise, prices, etc.

In view of the presentation of the advisers in the user browsers (111, . . . , 121), the users of the respective user browsers (111, . . . , 121) may selectively identify advisers and request the connection server (103) to establish connections between the users and the selected advisers. The connection server (103) is configured to call the user phones (113, . . . , 123) and the adviser phones (115, . . . , 125) separately and then bridge the respective calls to establish, via the telecommunication network (107), telephonic connections between the user phones (113, . . . , 123) and the adviser phones (115, . . . , 125). The advisers provide services over the telephonic connections between the user phones (113, . . . , 123) and the adviser phones (115, . . . , 125); and the connection server (103) is configured to charge the users on behalf of the advisers for the services rendered over the telephonic connections.

In FIG. 7, the data store (109) is configured to store the communication records (401) identifying the telephonic connections between the user phones (113, . . . , 123) and the adviser phones (115, . . . , 125) by the connection server (103).

After the communication sessions with the advisers, the users may use the user phones (113, . . . , 123) and/or the user browsers (111, . . . , 121) to provide the user ratings (405) of the services provided by the advisers and/or user feedback about the services. In FIG. 7, the data store (109) is configured to store the user ratings (405) and the records (403) of the user feedback.

For example, a user may use a user browser (111) to select an adviser based on a listing presented in the user browser (111), and identify the user phone (113) by providing the phone number of the user phone (113). An adviser phone (115) of the selected adviser is identified, for example, based on a phone number pre-associated with the listing of the adviser in the data store (109). After identifying a source of payment, such as a stored value account of the user, a credit card account, a debit card account, a checking account, a prepaid account, etc., the connection server (103) connects the user phone (113) to the adviser phone (115) via the telecommunication network (107), allowing the adviser to deliver services, such as advices, entertainments, information, etc., to the user over the telephonic connection.

In one embodiment, the connection server (103) is configured to monitor the telephonic connection to determine a time period in which the services of the adviser is provided to the user and charge the source of payment on behalf the adviser.

In one embodiment, the web server (101) and/or the connection server (103) are further configured to monitor the user interaction with the system to detect an indication of dissatisfaction of the user with the services provided by the user. In response to the indication, the web server (101) (or a further server connected to the data store (109)) is configured to determine, without further communicating with the user, whether the dissatisfaction is genuine. Instead of communicating with the user to investigate the dissatisfaction, which may incur further cost and/or inconvenience to the user and/or require human resources from the system, the system is configured to validate the dissatisfaction based on an automated analysis of the communication records (401), the user feedback records (403), the user ratings (405), and/or the user patterns (407) of the usage of the system.

For example, the system may determine whether the dissatisfaction is consistent with the user ratings (405) provided by the user and/or other users for the services from the adviser and/or similar advisers (e.g., advisers providing services in the same category/topic, having the same average user ratings, offering services in a same time period).

For example, the system may determine whether the dissatisfaction is consistent with the records (403) of user feedback provided by the user and/or other users for the services from the adviser and/or similar advisers.

For example, the system may determine whether the dissatisfaction is consistent with the communication records (401) indicating the time durations of the communication connections provided between the adviser and the user and/or other users for the services from the adviser and/or similar advisers.

For example, the user patterns (407) may include the payment history of the user and/or past refund requests to determine the likelihood that the indication of the dissatisfaction is motivated by an attempt to game the system and to avoid the payment for the quality services provided by the adviser.

In one embodiment, the connection server (103) may further monitor the communications provided over the telephonic connections between the user phones (113, . . . , 123) and the adviser phones (115, . . . , 125) to evaluate the quality of services.

For example, the connection server (103) may measure the accumulated duration of time periods in which there is a lack of communication over the telephonic connection provided by the connection server.

For example, the connection server (103) may measure the voice volume the adviser during the time period to detect poor communication quality.

For example, the connection server (103) may analyze the voice change in the communication between the adviser and the user to detect emotional changes to evaluate the quality of the services of the adviser and/or to detect an indication of dissatisfaction. For example, the connection server (103) may perform voice recognition of the communication between the adviser and the user to detect verbal expressions of dissatisfaction by the user.

In one embodiment, the system evaluates a probability of the authenticity of the dissatisfaction of the user, based on the stored data, such as the communication records (401), the user feedback records (403), the user ratings (405), the user patterns (405), etc. When the probability of the authenticity is above a threshold, the web server (101) (or another server connected to the data store (109)) is configured to provide a refund to the user without the user having to make a refund request, and/or without the user having to provide an explicit input to confirm the dissatisfaction detected by the system.

In some embodiments, the adviser phones (115, . . . , 125) and the user phones (113, . . . , 123) may be connected to traditional land-line of telephone networks, wireless telecommunication networks for mobile phones (e.g., cellular phones, smart phones), or data communication networks connected to computing devices running soft phones (e.g., via Voice over Internet Protocol or other communication protocols).

In some embodiments, the user browsers (111, . . . , 121) may run in the same computing devices on which the respective user phones (113, . . . , 123) of the users are implemented, or in computing devices separate from the user phones (113, . . . , 123).

FIG. 7 illustrates a system to establish telephonic connections for real time communications. Alternatively or in combination, the user phones (113, . . . , 123) and the adviser phones (115, . . . , 125) can be replaced with computing devices, such as computers, smart phones, tablet computers, digital media players, personal digital assistants, etc., for other forms of real time communications, such as instant messaging, text chat, video chat, etc.

Figure 8:
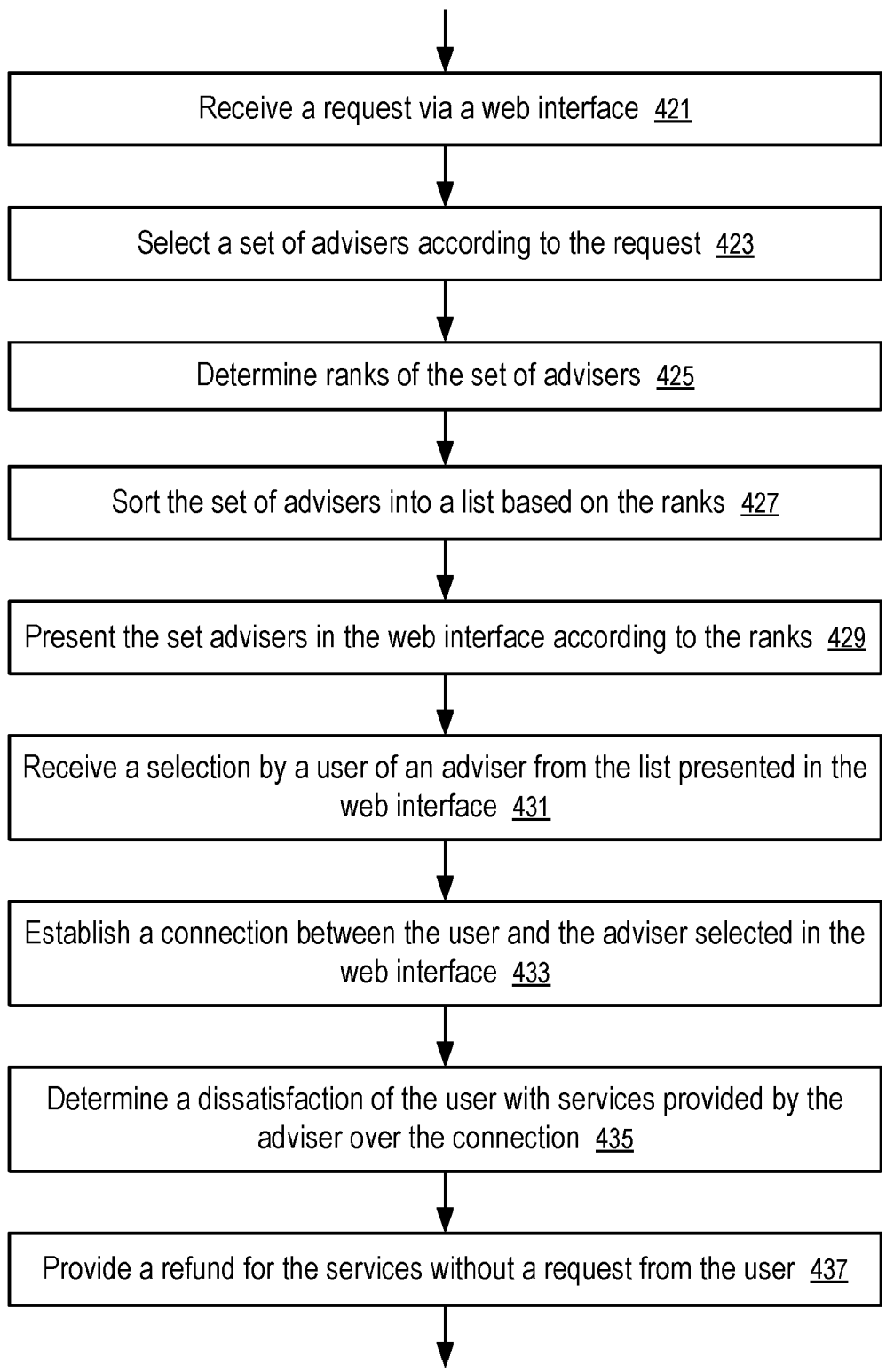
FIG. 8 shows a method to provide a refund for unsatisfied services according to one embodiment.

FIG. 8 shows a method to provide a refund for unsatisfied services according to one embodiment. For example, the method of FIG. 8 can be implemented in the system illustrated in FIG. 7.

In one embodiment, a computing apparatus in a communication system is configured to: receive (421) a request via a web interface implemented in a user browser (111); select (423) a set of advisers according to the request; determine (425) ranks of the set of advisers; sort (427) the set of advisers into a list based on the ranks; present (429) listings (131) of the set advisers in the web interface according to the ranks; receive (431) a selection by a user of an adviser from the list of advisers presented in the web interface; establish (433) a connection between the user and the adviser selected in the web interface; determine (435) a dissatisfaction of the user with services provided by the adviser over the connection; and provide (437) a refund for the services without a request from the user.

Figure 9:
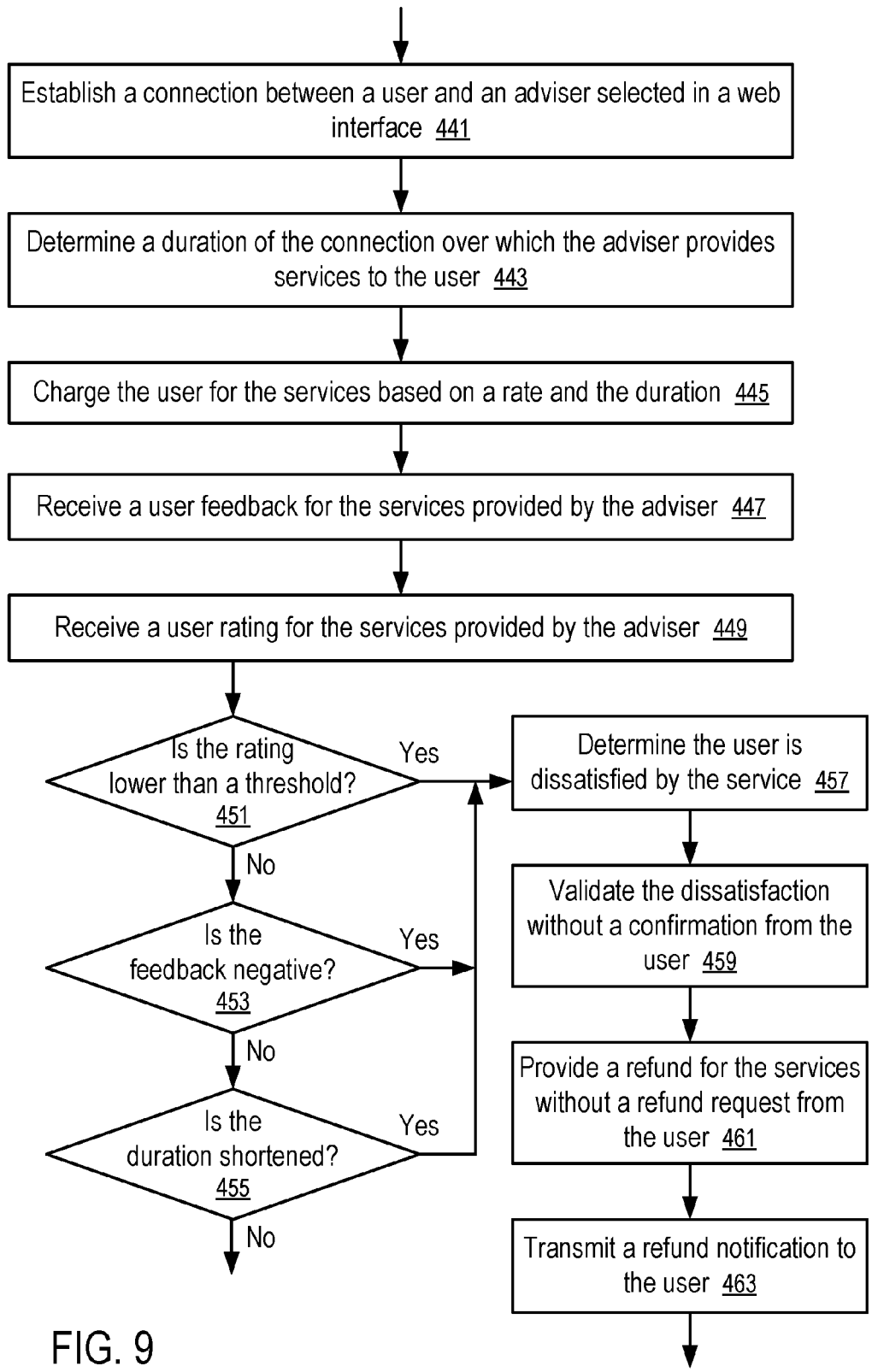
FIG. 9 shows a method to detect dissatisfaction to provide an automatic refund according to one embodiment.

FIG. 9 shows a method to detect dissatisfaction to provide an automatic refund according to one embodiment. For example, the method of FIG. 8 can be implemented in the system illustrated in FIG. 9.

In one embodiment, a computing apparatus in a communication system is configured to: establish (441) a connection between a user and an adviser selected in a web interface; determine (443) a duration of the connection over which the adviser provides services to the user; charge (445) the user for the services based on a rate (e.g., price 213) and the duration; receive (447) a user feedback for the services provided by the adviser; and receive (449) a user rating for the services provided by the adviser.

If it is determined that the rating is lower than a threshold (451), or the feedback is negative (453), or the duration of the communication is shortened (455), the computing apparatus is configured to: determine (457) the user is unsatisfied by the service; validate (459) the dissatisfaction without a confirmation from the user; and provide (461) a refund for the services without a refund request from the user; transmit (463) a refund notification to the user.

In one embodiment, a computing apparatus configured to perform the method of FIG. 8 and/or FIG. 9 includes one or more components illustrated in FIG. 7. For example, the computing apparatus may include one or more of: the data store (109), the web server (101), and the connection server (103), each of which can be implemented using one or more data processing systems, such as a data processing system illustrated in FIG. 10 with more or less components.

In one embodiment, the computing apparatus includes the data store (109) to store data identifying: the listings (131) of a plurality of advisers, availability (209) of the advisers for real time communications over the communication system, and other information of the advisers, such as topics of services offered by the advisers, the average ratings (207) from the prior customers of the advisers, etc.

In one embodiment, the computing apparatus includes a web server (101) configured to provide data to a user browser (111) to present a user interface to receive user input requesting a list of advisers.

Based at least in part on the availability of the advisers, the information of the advisers, and the user input, the computing apparatus identifies and ranks the list of advisers. The web server (101) then provides the list to the user browser (111) for presentation in the user interface.

After the web server (101) receives a user selection of an adviser from the list, the web server (101) communicates the selection to the connection server (103), which provides a real time communication connection between a user of the user interface and the adviser selected from the list.

In one embodiment, the computing apparatus is configured to charge the user for the services provided over the real time communication connection.

To ensure the user satisfaction with the services charged for by the computing apparatus, the web server (101) and/or the connection server (103) monitors services provided by the adviser over the real time communication connection to detect an indicator of dissatisfaction of the user with the services provided over the real time communication connection.

If an indicator of the dissatisfaction is detected, the computing apparatus is configured to determine authenticity of the dissatisfaction of the user without an input from the user and provide, by the computing apparatus and without a user request, a refund to the user.

For example, the web server (101) or the connection server (103) may receive a user rating of the services provided over the real time communication connection; and the indicator of dissatisfaction can be detected, e.g., based on the user rating being below a threshold.

For example, the web server (101) or the connection server (103) may receive a user feedback of the services provided over the real time communication connection; and the indicator of dissatisfaction can be detected, e.g., based on the user feedback being negative. In one embodiment, patterns of words in user feedback that correspond to negative comments and/or user dissatisfaction are identified via a statistical analysis; and the user feedback is matched with the patterns to determine whether the feedback is negative.

For example, the connection server (103) measures the actual duration of the real time communication connection provided between the user and the adviser. The indicator of dissatisfaction can be detected, e.g., based on the actual duration of the real time communication connection being short than a threshold or an expected duration (e.g., the predetermined duration limit for a communication session purchased by the user).

In one embodiment, the computing apparatus is configured to determine an expected duration of the real time communication connection (e.g., based on a profile of the user and similar users communicating with the adviser or similar advisers). When a ratio between the actual duration and the expected duration is less than a threshold, the indicator of dissatisfaction is detected.

In one embodiment, after the indicator of dissatisfaction is detected, the computing apparatus is configured to determine the authenticity of the dissatisfaction.

For example, the authenticity of the dissatisfaction can be validated based at least in part on a pattern of the user in usage of the communication system.

For example, the pattern can be based at least in part on a set of user feedbacks to services provided by different advisers connected to the user via the communication system. When the user feedback matches with a pattern of user feedbacks associated with dissatisfactions, the authenticity of the dissatisfaction of the user can be at least validated in part.

For example, the pattern can be based at least in part on user ratings to services provided by different advisers connected to the user via the communication system. When the user rating is consistent with user ratings associated with dissatisfactions, the authenticity of the dissatisfaction of the user can be at least validated in part.

For example, the pattern can be based at least in part on connection durations for services provided by different advisers connected to the user via the communication system. When the time duration of the connection between the user and the adviser is consistent with the connection durations associated with dissatisfactions, the authenticity of the dissatisfaction of the user can be at least validated in part.

In one embodiment, the authenticity of the dissatisfaction of the user is evaluated based on multiple aspects, such as user ratings, communication durations, user feedbacks, accumulated silent time periods, voice level/pattern in the communications, emotion changes in the communications, etc. The results of the evaluations are combined to determine whether the likelihood of the authenticity of the dissatisfaction of the user is above a threshold.

In one embodiment, the computing apparatus is configured to compute statistics of services provided by the adviser to different users via the communication system. The dissatisfaction of the user is detected based at least in part on the statistics.

For example, the statistics can be based at least in part on user ratings from the different users. A user rating of the services provided to the user over the real time communication connection can be compared with the statistics to detect the dissatisfaction.

For example, when a ratio between the user rating for the services provided to the user over the real time communication connection and the average rating of the adviser and/or advisers providing similar services is below a threshold, an indication of the dissatisfaction of the user is detected.

For example, the statistics can be based at least in part on user feedbacks from the different users; and a user feedback of the services provided to the user over the real time communication connection is compared with the statistics to detect the dissatisfaction.

For example, a statistics model can be established to evaluate the level of negativity of user feedbacks. When the level of the negativity of the user feedback of the services provided to the user over the real time communication connection is above a threshold, an indication of the dissatisfaction of the user is detected.

For example, the statistics can be based at least in part on user can be based at least in part on durations of communication connections of the adviser with the different users; and a time duration of the real time communication connection provided between the user and the adviser is compared with the statistics to detect the dissatisfaction.

For example, the average time duration of communication connections of different users with dissatisfactions can be compare to the time duration of the real time communication connection provided between the user and the adviser. When the time duration of the user is less than the average time duration, an indication of the dissatisfaction of the user is detected.

In one embodiment, the system is configured to identify the communication connections for which the respective users have explicitly requested refunds for poor services. A statistical model is established and trained to tell the communications connections with refund requests apart for the other communications connections. The statistical model is established and/or trained based on a set of parameters, such as user ratings, user feedbacks, time durations, quality monitory parameters measured for the communications during the respective connections, such as the length of accumulated silent periods, patterns of silent periods, voice distribution of the communications, emotion indication distribution of the communications, etc. The statistical model is then applied to the real time communication connection provided between the user and the adviser having the corresponding parameters to determine whether the connection is to be classified as being associated with a refund or not.

In one embodiment, the authenticity of the dissatisfaction of the user is validated is based at least in part on a payment history of the user for services provided over communication connections established via the communication system. In one embodiment, a good payment history is configured to weight for validation the authenticity of the dissatisfaction of the user; and a poor or lack of payment history is configured to weight against validation the authenticity of the dissatisfaction of the user.

In one embodiment, the computing apparatus is configured to valid the authenticity of the dissatisfaction of the user is without a communication with the user to confirm the dissatisfaction; and the refund is provided to the user without a refund request from the user. The automated process improves the efficiency of the system in providing guarantee on satisfaction of the services provided by the advisers.

In one embodiment, in response to the automated refund, the computing apparatus transmits a preemptive message to the user to report the refund, without requiring any input from the user.

User Assessment for Enrollment

In one embodiment, an interactive user assessment is performed when a user uses a browser (e.g., 111, . . . , 121) to visit the web server (101) of the system. The assessment is used to assist enrollment of the user for the services of the system that is configured to provide real time communications connections between user phones (113, . . . , 123) and adviser phones (e.g., 115, . . . , 125).

The interactive user assessment can be conducted as part of the enrollment process or prior to the user decides to enroll for the services of the system. The user assessment allows the system to identify the needs of the user, the state and/or skills of the user related to the needs of the user, and the recommended advisers to meet the needs of the user based on the skill and/or need level of the user.

For example, the advisers may provide coaching services over real time communications connections. The interactive user assessment makes the coaching experience in the system interactive from start and help the system recommend coach/advisers based on the assessment/test score and coach/advisers availability.

The initial interaction can potentially increase new user registration if the user is not already a member and eventually uses services of the system.

In one embodiment, after the interactive user assessment, a recommendation engine of the system uses the assessment results and advisers' availability to provide the initial recommendation of advisers that may best match the needs and skill level of the user. The initial recommendation generated based on the interactive user assessment encourages the user to enroll for the services of the system and thus encourages the user to use the system in obtain coaching services from the recommended advisers.

In one embodiment, the interactive user assessment/test is based on questions designed to reveal the user needs and skill or need levels based on correlation between the answers to the questions and skill/need levels.

Using the user assessment/test scores, the performance of an adviser recommendation engine can be improved in offering coaching help.

Figure 11:
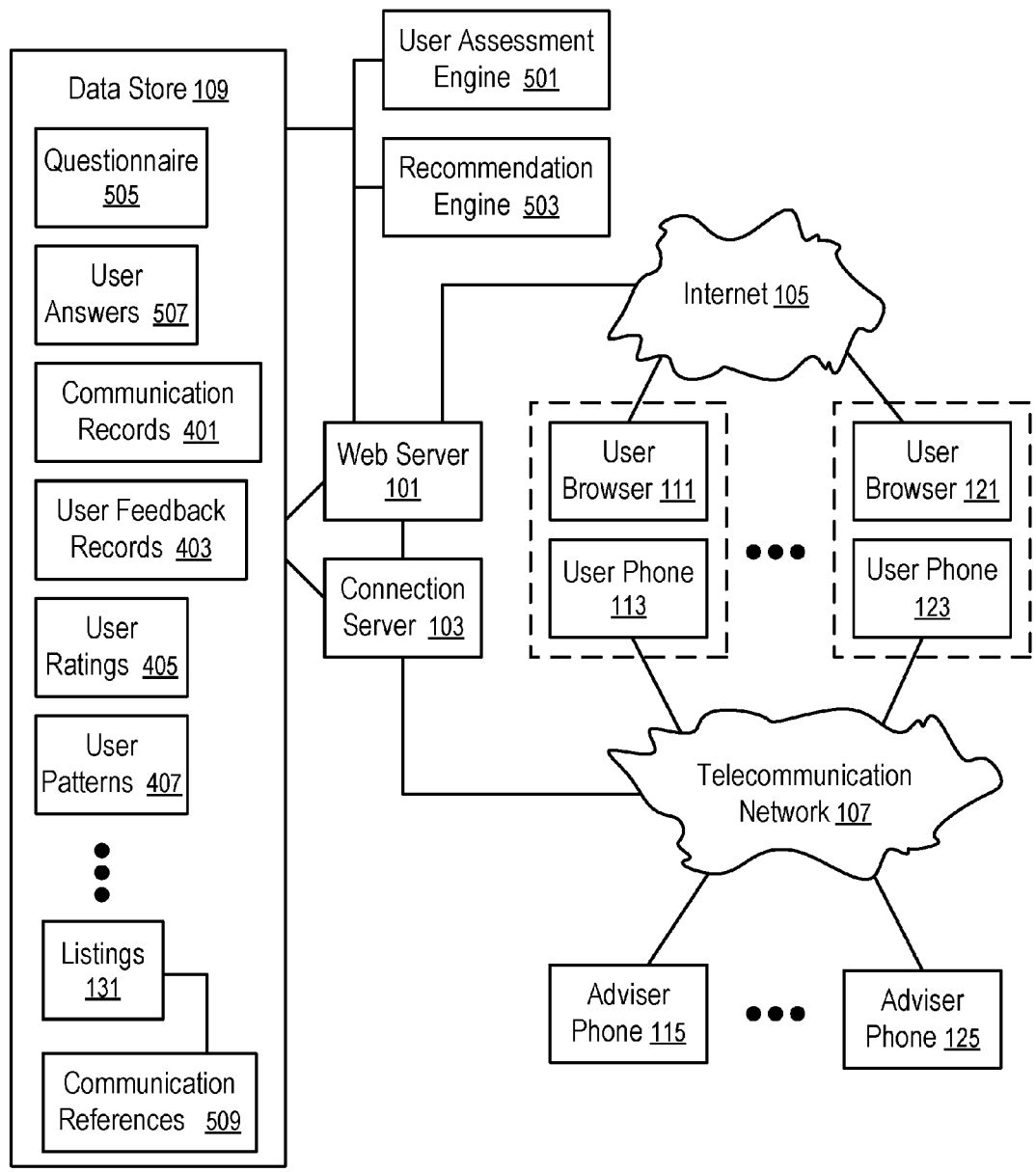
FIG. 11 shows a system to enroll users for real time communication connections with advisers according to one embodiment.

FIG. 11 shows a system to enroll users for real time communication connections with advisers according to one embodiment.

In FIG. 11, after a user uses the browser (111, . . . , or 121) to visit the web server (101) of the system, the user assessment engine (501) launches an expert curated pre-build assessment test, retrieving the questions from the questionnaire (505) based on information provided by the user, such as the initial selection of a category of services and subsequent answers to the expert curated questions.

The user assessment engine (501) presents the question via the web server (101) to the user browser (111, . . . , or 121), receives the user answers (507) to the corresponding user browser (111, . . . , or 121), and saves the user answers (507) and/or the test scores in the data store (109).

In one embodiment, the user answers (507) of existing users are statistically correlated with the communication records (401) of the corresponding users to identify the correlation of patterns in the user answers (507) and the patterns in the communication records (401). For example, correlation of clusters of answers (507) and clusters of advisers in the communication records (401) can be used to predict that users having answers (507) in the corresponding answer clusters are likely to communicate to advisers in the corresponding adviser clusters. Further, the user answers (507) can be correlated to user ratings (405) and/or the user feedback records (403) to identify the advisers who are likely to provide satisfactory services to the user.

In one embodiment, the recommendation engine (503) is configured to use the user answers (507) and the communication records (401), the user feedback records (403), the user ratings (405) and/or the user patterns (407) to provide personalized ranks of the listings (131) for the user, based on the assessment result of the user.

In one embodiment, the recommendation engine (503) is further configured to use machine learning to improve the recommendations in an automatic way.

In one embodiment, the recommendation engine (503) uses test scores to look into pre-calculated rankings and then look for coach availability. For example, the rankings of the listings may be categorized based on test scores. Thus, from the test score of a particular user, a set of personalized rankings of the listings can be retrieves. The listings ranked for the user is filtered based on the current availability of the advisers to select and present the top ranked available advisers to the user browser (111, . . . , or 121) via the web server (101). Thus, the user may an adviser from the personalized recommendation of advisers to request coaching services. If the user requests a connection to a selected adviser, the user is prompted to enroll in the system prior to the establishment of the connection to the selected adviser.

In one embodiment, the recommendation engine (503) recommends the advisers based on not only the test results of the user assessment and the availability of the advisers, but also other attributes of the listings, such as prices, ratings, etc.

In one embodiment, the recommendation engine (503) is configured to determine the personalized ranks of the listings based on the statistical correlation among the user answers (507) and the listing attributes, such as prices, user ratings (405), user feedback records (403), communication records (401), etc.

For example, when a new user visits the website hosted on the web server (101) to look for advisers who provide coaching services on a particular topic. After the user selects the topic of coaching or the category of advisers, the user is directed to a webpage configured to assess the user via a questionnaire presented by the user assessment engine (501) via the web server (101). In one embodiment, a computer generated questionnaire or assessment test is performed via a user interface presented on the webpage. The user interface collects the user responses and stored the user answers in the data store (109). After the completion of the assessment (or during the assessment process), the recommendation engine (503) identifies the personalized ranks of the listings based on the users answers (507) that have been collected and presents the list of recommended advisers. The recommended list of advisers is configured to change dynamically as the user provides more user answers (507) to the questions of the user assessment test. When the user selects an adviser from the recommended list of adviser listings, the web server (101) starts an enrollment process to register the user and then a connection process to provide a real time communication connection between the user and the user selected adviser.

In one embodiment, the user is prompted to provide a communication reference such as an email address prior to the presentation of the questionnaire or assessment test. Thus, even if the user does not register or enroll in the service of the system after the test, or request connections to advisers, the communication reference can be used to provide continuous offer based marketing.

In some embodiments, a user already enrolled for the services of the system may also choose to perform the user assessment to allow the system to improve adviser recommendations. For example, the user answers (507) of the existing users can be used to train the recommendation engine, via machine learning, for improved ranking of listings (131).

Rank Users

In one embodiment, the transcripts of communications between users and advisers are analyzed to rank the users. After real time communications connections are provided by the system via the connection server (103) for the users and advisers, the connection server (103) may also provide communication connections for text based communications, such as email communications and/or chat communications, in addition to telephonic communications.

Figure 12:
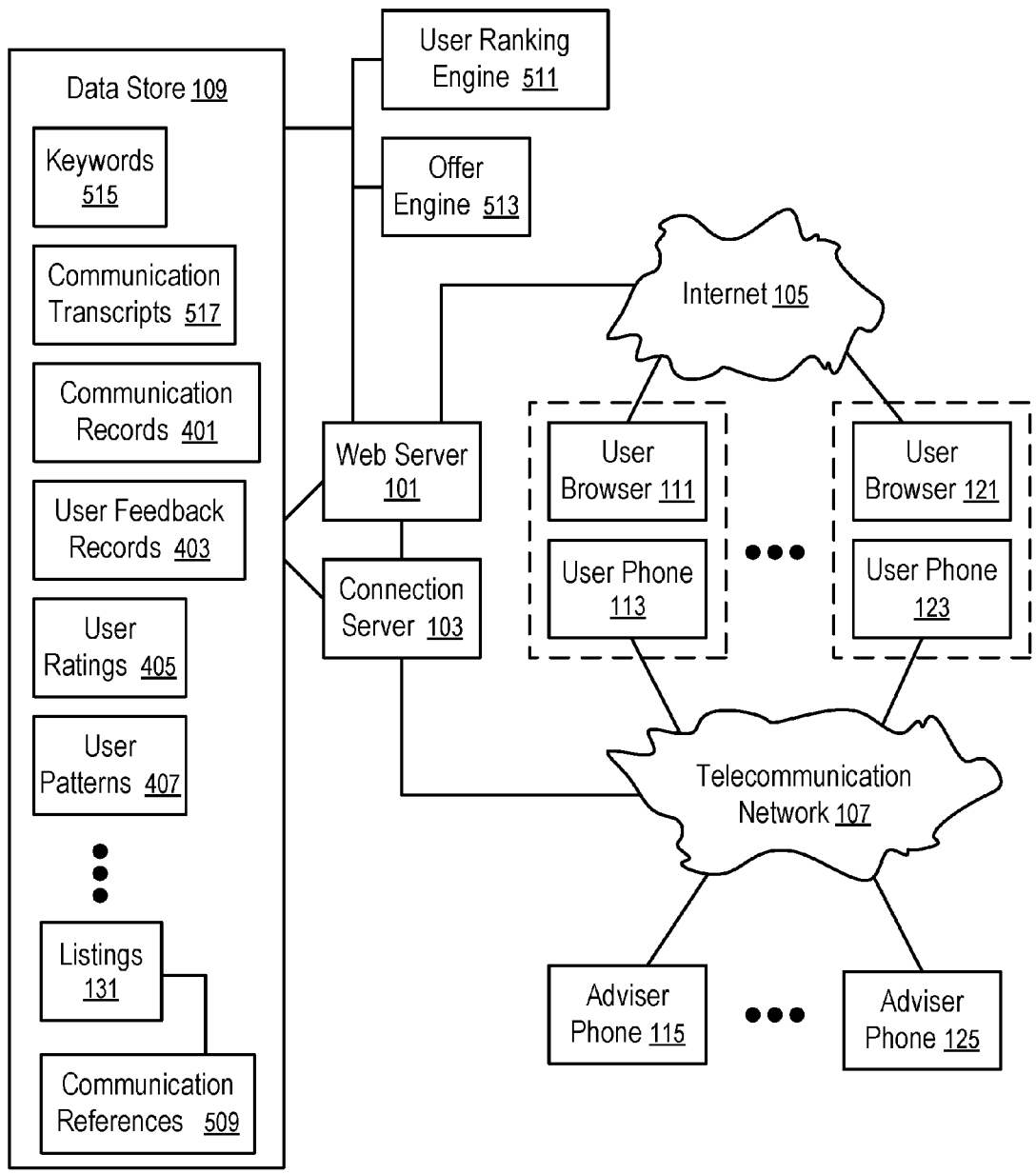
FIG. 12 shows a system to rank users of real time communication connections with advisers according to one embodiment.

FIG. 12 shows a system to rank users of real time communication connections with advisers according to one embodiment.

In one embodiment, the connection server (103) is configured to store the communication transcripts (517) for the communications between the user phones (e.g., 113, . . . , 123) and the adviser phones (e.g., 115, . . . , 125), including email transcripts and chat transcripts for the users that use the email and/or chat services.

In some embodiments, the connection server (103), or another server connected to the connection server (103), is configured to perform voice recognition on the telephonic communications between the user phones (113, . . . , 123) and adviser phones (115, . . . , 125), after the telephonic communications connections are provided by the connection server (103) between the respective phones (113, . . . , 123, . . . , 115, . . . , 125). Thus, the communication transcripts (517) may include the results of the voice recognition operations.

In one embodiment, the text patterns in the communication transcripts (517) are detected and correlated with the user patterns (407) to rank the users.

For example, the user patterns (407) may include the indication of the retention scores of the respective users of the user phones (113, . . . , 123). For example, from a sequence of past communication records (401), a retention score of the user can be calculated to indicate the probability that the user is a repeated customer of the system, a frequency to use the system by the user, the probability that the user will use the system in the future, a predicted time period to the next time the user will use the system for a connection to an adviser, a spending level of the user, a long term value of the user for the system, etc.

In one embodiment, the text patterns in the communication transcripts (517) are correlated the retention scores to establish a statistical model to compute the retention score of a user based on the presence of text patterns in a communication transcript of the user.

For example, in one embodiment, the data store (109) stores a list of keywords (515) that are predetermined to be indicative retention scores of the user. The user retention scores, or other user ranking scores, computed from the communications records (401) can be correlated via a statistical analysis with the presence, in the communication transcripts (517) of the respective users, of words that are selected from the list of keywords (515). The correlation results provide a statistical prediction model, using which the presence or absence of certain keywords (515) in a communication transcript of a user can be used to compute a predicted user retention score (or other user ranking score).

For example, a communication transcript of a user can be compared with the list of keywords (515) to determine the term frequencies of the keywords used in the communication transcripts. The term frequencies of the keywords form an input vector representing the retention score of the user. The process can be repeated for various existing users to form a set of sample points correlating the input vectors to the values of the retention score. A statistical analysis and/or a machine learning algorithm is applied to the sample points to establish a predictive model from which a given input vector can be applied to generate a predicted retention score.

After the predictive model is established, the system is configured to compute the predicted retention score to rank a user in response to a transcript of a communication between a user phone (113, . . . , or 123) and the adviser phone (115, . . . , or 125). For example, after a communication session that may include telephonic communications, emails and/or text chat, the transcript for the session can be applied to the predictive model to generate a ranking score of the user as a result of the communication session.

The predicted retention score can be used to recommend test customers to the advisers and/or generate targeted marketing offer for the customers to increase revenue stream.

The predicted retention score can be used to evaluate the customer satisfaction of the services provided by an adviser and implement automated satisfaction guarantee.

In one embodiment, the predicted retention score is computed for the services provided by a specific adviser. When the score is above (or below) a threshold, the system may recommend the customer to the adviser and suggest an offer to the customer to strengthen the relation between the customer and the adviser.

The subsequent communication records (401) of the user can be used to further train the predictive model to improve the prediction accuracy.

The above example uses a keyword list (515) based text analysis to generate a predictive model and compute a predicted retention score. In other embodiments, alternative natural language processing techniques can be used to generate input vectors representative of the text patterns in the communications transcripts (517) that are indicative of the retention score (or other user ranking scores).

Figure 13:
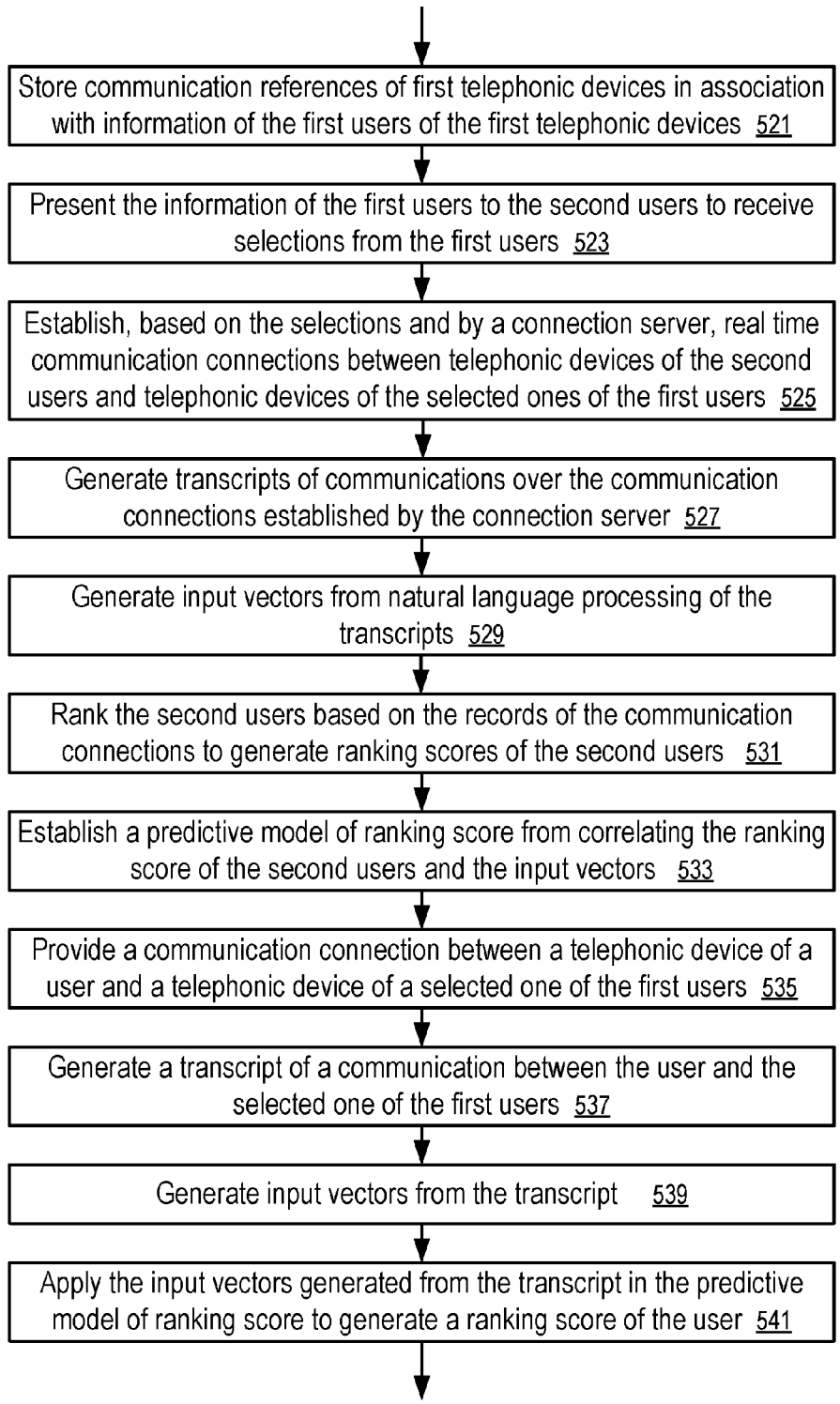
FIG. 13 shows a method to rank users of real time communication connections with advisers according to one embodiment.

FIG. 13 shows a method to rank users of real time communication connections with advisers according to one embodiment. For example, the method of FIG. 13 can be implemented in a system of FIG. 12 and may optionally include any of the methods of FIGS. 3-6 and 8-9. Further, the system of FIG. 12 can be enhanced with the functionality of the system of FIG. 11.

In FIG. 13, a computing apparatus is configured to: store (521) communication references (509) of first telephonic devices (115, ..., 125) in association with information (e.g., listings (131)) of the first users of the first telephonic devices (e.g., 115, ..., 125); present (523) the listing information (131) of the first users to the second users to receive selections from the first users; establish, (525) based on the selections and by a connection server (103), real time communication connections between telephonic devices (113, ...) of the second users and telephonic devices (e.g., 115, ..., 125) of the selected ones of the first users; generate (527) transcripts (517) of communications over the communication connections established by the connection server (103); generate (529) input vectors from natural language processing of the transcripts (517); rank (531), using a user ranking engine (511), the second users based on the records (401) of the communication connections to generate ranking scores of the second users; establish (533), for the user ranking engine (511), a predictive model of ranking score from correlating the ranking score of the second users and the input vectors; provide (535), via the connection server (103), a communication connection between a telephonic device (e.g., 123) of a user and a telephonic device (e.g., 125) of a selected one of the first users; generate (537) a transcript (517) of a communication between the user and the selected one of the first users; generate (539) input vectors from the transcript (517); and apply (541), by the user ranking engine (511), the input vectors generated from the transcript (517) in the predictive model of ranking score to generate a ranking score of the user.

The computing apparatus includes a data store (109) storing: communication references (509) of a first set of telephonic devices (e.g., 115, ..., 125) that are registered in the data store (109); and listing information (131) about first users of the first set of telephonic devices (115, ..., 125).

The computing apparatus further includes a web server (101) coupled with the data store (109) and configured to: present the listing information (131) of the first users of the first set of telephonic devices (115, ..., 125) to second users of a second set of telephonic devices (113, ...); and receive requests from the second users identifying selected ones of the first users.

The computing apparatus further includes a connection server (103) coupled with the data store (109) and the web server (101) and configured to, in response to the requests, provide communication connections between respective telephonic devices (113, ...) of the second users and respective telephonic devices (115, ..., 125) of the selected ones of the first users based on communication references (509) in the data store (109). For example, the first users may be advisers providing coaching services over the communication connections established by the connection server (103) between the second users and the selected ones of the first users.

For example, after a user is enrolled for the service of the connection server (103), the user of the user browser (111) may select an adviser based on the listings (131) presented via the web server (101), provide a communication to the web browser (111) of the user in a web page or application downloaded from the web server (101) and thus cause the web server (101) to provide instructions to the connection server (103) to separately call the phone (113) of the user and call the adviser phone (115) of the corresponding adviser selected by the user. The connection server (103) then bridges the two calls to establish a connection between the user phone (113) and the adviser phone (115).

For example, after a user is enrolled for the service of the connection server (103), the user may use the user phone (113) to call the connection server (103), which further connects the call to the adviser phone (115) based on a selection made by the user. The selection can be made via the telephonic connection between the connection server (103) and the user phone (113), or via the web server (101) which provides a communication reference that is temporally associated with the adviser phone (115) for the user phone (113) after the user selects the listing (131) of the adviser. When the communication reference is used to reach the connection server (103) from the user phone (113), the connection server (103) looks up the communication reference of the adviser and uses the communication reference to further connect the call to the adviser phone (115).

The computing apparatus is configured to generate transcripts (517) of communications over the communication connections established by the connection server (103) between the second users and the selected ones of the first users, and store, in the data store (109), communication records (401) of the communication connections established by the connection server (103).

For example, the computing apparatus performs voice recognition of the communications transmitted through the communication connections provided by the connection server (103) to generate transcripts (517). In some instances, the communication connections provided by the connection server (103) facilitates not only voice communications but also text communications, such as instant messages; and thus, the text communications can be stored as part of the communication transcripts (517). In some instances, the connection server (103) also facilitates non-real-time communications, such as voice mails, email communications forward via the connection server (103) without revealing the address of an adviser to a customer of the adviser and without revealing the address of the customer to the adviser. Such emails and voice mails can also be stored and/or processed as part of the communication transcripts (517).

The computing apparatus performs natural language processing on the transcripts (517) to generate input vectors.

The input vectors correspond to text patterns identified via the natural language processing of the transcripts (517).

For example, the data store (109) further stores a list of keywords (515). The natural language processing of the transcripts (517) is performed by the computing apparatus based on the list of keywords (515).

For example, term frequencies of the list of keywords (517) in the transcript(s) (517) of one or more communications between a user and an adviser can be calculated as the input vectors for the user as a customer of the adviser.

The computing apparatus generates ranking scores of the second users from the communication records (401). For example, ranking score can be calculated based on the number of communications between a user and the user as a customer of an adviser. For example, ranking score can be calculated based on the total communication time period between a user and the user as a customer of an adviser. For example, ranking score can be calculated based on the fees charged by an adviser charging a customer for the coaching services delivered by the adviser to the customer over the communication connection provided via the connection server (103).

The computing apparatus is configured to correlate the input vectors with the ranking scores to establish a predictive model of ranking score.

For example, the computing apparatus performs a statistical analysis of correlation of the input vectors and the ranking scores to establish the predictive model of ranking score.

For example, the computing apparatus uses machine learning technique in training the predictive model of ranking score to predict, from the input vectors generated from the communication transcripts (517), scores that match the ranking scores computed from the communication records (401). For example, from the input vectors generated the transcripts of one or more communications between an adviser and a customer of the adviser, the predictive model computes a predicted score which may or may not agree with the ranking score communicated from the communication records of communications between the adviser and the customer. The machine learning technique is used to statistically reduce or minimize the mismatch between the predicted scores and ranking scores computed from the communication records over a large number of samples of advisers and their customers. Subsequently, the prediction can be used by the user ranking engine (511) to estimate a ranking score based on one or more initial communications between a customer and an adviser.

For example, after providing, using the connection server, a communication connection between a telephonic device (123) of a user and a telephonic device (125) of a selected one of the first users, selected by the user of the telephonic device (123), the computing apparatus is configured in one embodiment to: generate a transcript of a communication between the user and the selected one of the first users; perform natural language processing on the transcript of the communication to generate corresponding input vectors from the transcript; and apply, using the user ranking engine (511), the corresponding input vectors in the predictive model of ranking score to generate a ranking score of the user of the telephonic device (123).

For example, the offer engine (513) can be configured to use the ranking score of the user to identify a recommendation for a connection to one of the first users, or an offer to the user of the telephonic device (123).

In one embodiment, the prediction and the selection of an offer is based on an initial portion of a communication session. Thus, the offer can be communicated before the communication session is terminated.

Computing Apparatus

In one embodiment, the operations discussed above are configured to be performed on a computing apparatus, which may include one or more components illustrated in FIG. 1, such as a web server (101), the connection server (103), the data store (109), and/or one or more user devices (e.g., devices running the user browser (111, . . . , 121), the user phones (113, . . . , 123), adviser phones (115, . . . , 125)).

In one embodiment, a user device can be a personal computer, a mobile computing device, a notebook computer, a netbook, a personal media player, a personal digital assistant, a tablet computer, a mobile phone, a smart phone, a cellular phone, etc. The user device can be implemented as a data processing system as illustrated in FIG. 10, with more or fewer components.

Figure 10:
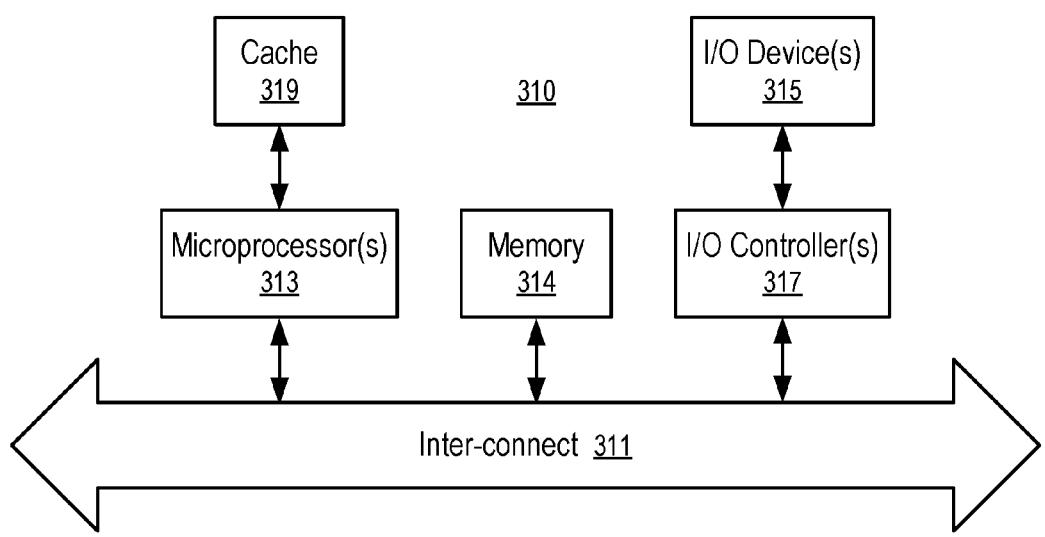
FIG. 10 illustrates a data processing system according to one embodiment.

In one embodiment, at least some of the components of the system disclosed herein can be implemented as a computer system, such as a data processing system illustrated in FIG. 10, with more or fewer components. Some of the components may share hardware or be combined on a computer system. In one embodiment, a network of computers can be used to implement one or more of the components.

In one embodiment, data discussed in the present disclosure can be stored in storage devices of one or more computers accessible to the components discussed herein. The storage devices can be implemented as a data processing system illustrated in FIG. 10, with more or fewer components.

FIG. 10 illustrates a data processing system according to one embodiment. While FIG. 10 illustrates various parts of a computer system, it is not intended to represent any particular architecture or manner of interconnecting the parts. One embodiment may use other systems that have fewer or more components than those shown in FIG. 10.

In FIG. 10, the data processing system (310) includes an inter-connect (311) (e.g., bus and system core logic), which interconnects a microprocessor(s) (313) and memory (314). The microprocessor (313) is coupled to cache memory (319) in the example of FIG. 10.

In one embodiment, the inter-connect (311) interconnects the microprocessor(s) (313) and the memory (314) together and also interconnects them to input/output (I/O) device(s) (315) via I/O controller(s) (317). I/O devices (315) may include a display device and/or peripheral devices, such as mice, keyboards, modems, network interfaces, printers, scanners, video cameras and other devices known in the art. In one embodiment, when the data processing system is a server system, some of the I/O devices (315), such as printers, scanners, mice, and/or keyboards, are optional.

In one embodiment, the inter-connect (311) includes one or more buses connected to one another through various bridges, controllers and/or adapters. In one embodiment the I/O controllers (317) include a USB (Universal Serial Bus) adapter for controlling USB peripherals, and/or an IEEE-1394 bus adapter for controlling IEEE-1394 peripherals.

In one embodiment, the memory (314) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of tangible, non-transitory computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not for other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
    providing a connection server configured to establish real time communication connections between telephonic devices, wherein:
        the connection server is coupled with a data store storing:
            communication references of a first set of telephonic devices registered in the data store, and
            information about first users of the first set of telephonic devices;
        wherein in response to requests received from second users of a second set of telephonic devices identifying selected ones of the first users, the connection server establishes communication connections between respective telephonic devices of the second users and respective telephonic devices of the selected ones of the first users based on communication references in the data store;
    generating, by a computing apparatus, transcripts of communications over the communication connections established by the connection server between the second users and the selected ones of the first users;
    storing, in the data store, communication records of the communication connections established by the connection server;
    performing, by the computing apparatus, natural language processing on the transcripts to generate input vectors;
    generating, by the computing apparatus, ranking scores of the second users from the communication records, wherein the input vectors are correlated with the ranking scores to establish a predictive model of ranking score; and
    after the connection server provides a communication connection between a telephonic device of a user and a telephonic device of a selected ones of the first users:
        generating, by the computing apparatus, a transcript of a communication between the user and the selected ones of the first users;
        performing, by the computing apparatus, natural language processing on the transcript of the communication to generate first input vectors; and
        applying, by the computing apparatus, the first input vectors in the predictive model of ranking score to generate a ranking score of the user.

2. The method of claim 1, wherein the input vectors correspond to text patterns identified via the natural language processing of the transcripts.

3. The method of claim 1, wherein the data store further stores a list of keywords; and the natural language processing performed by the computing apparatus is based on the list of keywords.

4. The method of claim 3, wherein the input vectors generated from the transcripts includes term frequencies of the list of keywords in the transcripts.

5. The method of claim 4, wherein the input vectors are correlated with the ranking scores to establish the predictive model of ranking score via a statistical analysis of correlation of the input vectors and the ranking scores.

6. The method of claim 4, wherein the input vectors are correlated with the ranking scores to establish the predictive model of ranking score includes using a machine learning technique in training the predictive model of ranking score to predict, from the input vectors, scores that match the ranking scores.

7. The method of claim 1, wherein the communication connection between the telephonic device of the user and the telephonic device of the selected ones of the first users is provided by:
    establishing a first connection between the connection server and the telephonic device of the user;
    establishing a second connection between the connection server and the telephonic device of the selected ones of the first users; and
    bridging the first connection and the second connection.

8. The method of claim 7, wherein the generating of the transcript of the communication between the user and the selected ones of the first users includes performing voice recognition of the communication transmitted through the connection server bridging the first connection and the second connection.

9. The method of claim 8, wherein the first users provide coaching over the communication connections established by the connection server between the second users and the selected ones of the first users.

10. The method of claim 9, further comprising:
    identifying, by the computing apparatus, a recommendation for a connection to one of the first users based at least in part on the ranking score of the user.

11. The method of claim 9, further comprising:
    communicating, by the computing apparatus, an offer to the user based at least in part on the ranking score of the user.

12. A non-transitory computer storage medium storing instructions configured to instruct a computing device to perform a method, the method comprising:
    providing a connection server configured to establish real time communication connections between telephonic devices, wherein:
        the connection server is coupled with a data store storing:
            communication references of a first set of telephonic devices registered in the data store, and
            information about first users of the first set of telephonic devices;
        wherein in response to requests received from second users of a second set of telephonic devices identifying selected ones of the first users, the connection server establishes communication connections between respective telephonic devices of the second users and respective telephonic devices of the selected ones of the first users based on communication references in the data store;
    generating, by a computing apparatus, transcripts of communications over the communication connections established by the connection server between the second users and the selected ones of the first users;
    storing, in the data store, communication records of the communication connections established by the connection server;
    performing, by the computing apparatus, natural language processing on the transcripts to generate input vectors;

generating, by the computing apparatus, ranking scores of the second users from the communication records, wherein the input vectors are correlated with the ranking scores to establish a predictive model of ranking score; and after the connection server provides a communication connection between a telephonic device of a user and a telephonic device of a selected ones of the first users:

generating, by the computing apparatus, a transcript of a communication between the user and the selected ones of the first users;

performing, by the computing apparatus, natural language processing on the transcript of the communication to generate first input vectors; and applying, by the computing apparatus, the first input vectors in the predictive model of ranking score to generate a ranking score of the user.

13. A computing system, comprising:

a connection server configured to establish real time communication connections between telephonic devices, wherein:

the connection server is coupled with a data store storing:

communication references of a first set of telephonic devices registered in the data store, and information about first users of the first set of telephonic devices;

wherein in response to requests received from second users of a second set of telephonic devices identifying selected ones of the first users, the connection server establishes communication connections between respective telephonic devices of the second users and respective telephonic devices of the selected ones of the first users based on communication references in the data store;

a computing apparatus having a processor and a memory storing instructions configured to instruct the computing apparatus to perform a method comprising:

generating transcripts of communications over the communication connections established by the connection server between the second users and the selected ones of the first users;

storing, in the data store, communication records of the communication connections established by the connection server;

performing, by the computing apparatus, natural language processing on the transcripts to generate input vectors;

generating, by the computing apparatus, ranking scores of the second users from the communication records, wherein the input vectors are correlated with the ranking scores to establish a predictive model of ranking score; and after the connection server provides a communication connection between a telephonic device of a user and a telephonic device of a selected ones of the first users:

generating a transcript of a communication between the user and the selected ones of the first users;

performing natural language processing on the transcript of the communication to generate first input vectors; and applying the first input vectors in the predictive model of ranking score to generate a ranking score of the user.

14. The computing system of claim 13, wherein the input vectors correspond to text patterns identified via the natural language processing of the transcripts.

15. The computing system of claim 13, wherein the data store further stores a list of keywords; and the natural language processing performed by the computing apparatus is based on the list of keywords.

16. The computing system of claim 15, wherein the input vectors generated from the transcripts includes term frequencies of the list of keywords in the transcripts.

17. The computing system of claim 16, further configured to perform a statistical analysis of correlation of the input vectors and the ranking scores in correlating the input vectors with the ranking scores to establish the predictive model of ranking score.

18. The computing system of claim 16, further configured to use a machine learning technique in training the predictive model of ranking score to predict, from the input vectors, scores that match the ranking scores.

19. The computing system of claim 13, wherein to provide of the communication connection between the telephonic device of the user and the telephonic device of the selected ones of the first users, the connection server is configured to:

establish a first connection between the connection server and the telephonic device of the user;

establish a second connection between the connection server and the telephonic device of the selected ones of the first users; and bridge the first connection and the second connection.

20. The computing system of claim 19, further configured to perform voice recognition of the communication transmitted through the connection server bridging the first connection and the second connection to generate the transcript of the communication between the user and the selected ones of the first users; and the first users provide coaching services over the communication connections established by the connection server between the second users and the selected ones of the first users.

* * * * *